United States Patent
Werners et al.

(10) Patent No.: US 8,343,571 B2
(45) Date of Patent: Jan. 1, 2013

(54) COMPOSITE GLASS ELEMENT, PREFERABLY COMPOSITE SAFETY GLASS ELEMENT WITH AN INTEGRATED ELECTROLUMINESCENT (EL) ILLUMINATION STRUCTURE

(75) Inventors: Thilo-J. Werners, Leverkusen (DE); Michael Heite, Olpe (DE)

(73) Assignee: Bayer MaterialScience AG, Leverkusen (DE)

( * ) Notice: Subject to any disclaimer, the term of this patent is extended or adjusted under 35 U.S.C. 154(b) by 29 days.

(21) Appl. No.: 12/599,000

(22) PCT Filed: May 16, 2008

(86) PCT No.: PCT/EP2008/056008
§ 371 (c)(1),
(2), (4) Date: Nov. 5, 2009

(87) PCT Pub. No.: WO2008/142008
PCT Pub. Date: Nov. 27, 2008

(65) Prior Publication Data
US 2010/0090597 A1    Apr. 15, 2010

(30) Foreign Application Priority Data
May 18, 2007  (EP) .................................. 07108444

(51) Int. Cl.
*H05B 33/02* (2006.01)
*B05D 5/06* (2006.01)

(52) U.S. Cl. .......... 427/64; 313/498; 313/507; 313/508; 445/23

(58) Field of Classification Search .......... 313/498–512; 427/64; 219/543
See application file for complete search history.

(56) References Cited

U.S. PATENT DOCUMENTS

| | | | |
|---|---|---|---|
| 3,389,286 | A | 6/1968 | Takahashi et al. |
| 4,517,490 | A | 5/1985 | Takahashi et al. |
| 6,248,261 | B1 | 6/2001 | Takemura et al. |
| 6,545,408 | B2 * | 4/2003 | Uchida et al. ................. 313/504 |
| 7,009,156 | B2 | 3/2006 | Maeuser |
| 7,067,071 | B1 | 6/2006 | Kappe et al. |
| 7,252,790 | B2 | 8/2007 | Kappe et al. |
| 7,354,327 | B2 | 4/2008 | Maeuser |
| 2006/0057361 | A1 | 3/2006 | Ounaies et al. |

FOREIGN PATENT DOCUMENTS

| | | |
|---|---|---|
| DE | 4310082 A1 | 9/1994 |
| DE | 29617328 U1 | 11/1996 |
| DE | 10255199 A1 | 7/2003 |
| EP | 0267331 A1 | 5/1988 |
| GB | 837968 A | 6/1960 |
| WO | WO-01/34723 A1 | 5/2001 |
| WO | WO-03003397 A2 | 1/2003 |
| WO | WO-2005/104625 A1 | 11/2005 |
| WO | WO-2007/022226 A2 | 2/2007 |

* cited by examiner

*Primary Examiner* — Tracie Y Green
(74) *Attorney, Agent, or Firm* — Connolly Bove Lodge & Hutz LLP

(57) ABSTRACT

A laminated glass element is described, preferably a laminated safety glass element with integrated electroluminescence (EL) light structure, a method for producing a laminated glass element according to the invention, an insulating glass element containing at least one laminated glass element according to the invention and the use of a laminated glass element according to the invention as a decorative element and/or light element in interior spaces or for external use, preferably on external claddings of buildings, in or on items of equipment, in or on land or water vehicles or aircraft or in the advertising sector.

19 Claims, 11 Drawing Sheets

COMPOSITE GLASS ELEMENT, PREFERABLY COMPOSITE SAFETY GLASS ELEMENT WITH AN INTEGRATED ELECTROLUMINESCENT (EL) ILLUMINATION STRUCTURE

PRIORITY

Priority is claimed under 35 U.S.C. §371 to PCT/EP2008/056008, filed May 16, 2008, which claims priority to European application 07108444.6, filed May 18, 2007. The disclosures of the aforementioned priority applications are incorporated herein by reference in their entirety.

The present invention relates to a laminated glass element, preferably a laminated safety glass element, with integrated electroluminescence light structure, a method for producing a laminated glass element according to the invention, an insulating glass element containing at least one laminated glass element according to the invention and the use of a laminated glass element according to the invention as a decorative element and/or light element in interior spaces or for outside use, preferably on external claddings of buildings, in or on items of equipment, in or on land or water vehicles or aircraft or in the advertising sector.

Electroluminescence (also referred to below as "EL" in abbreviated form) is intended to refer to the direct luminescence excitement of light pigments (also referred to as light substances or luminophores) by an alternating electrical field.

Transparent EL arrangements, for example, EL light panels based on glass or transparent plastics material which can be used, for example, as information carriers, promotional banners or for decorative purposes, are known in the prior art.

For instance, DE 296 17 328 U1 relates to an EL light panel which is arranged in a hermetically sealed inner space of an insulating glass element. Electrical safety and protection from moisture and—depending on the configuration—protection from electromagnetic waves is thereby achieved.

EP 0 267 331 A1 relates to a laminated pane with a symbol which is embedded in the laminated adhesive layer and which is constituted or can be illuminated from the rear by an EL element. The electrical supply lines are constituted in an almost invisible manner by thin transparent metallic or oxidic conductor paths or layers within the laminate. After the voltage is switched on, the light symbol appears to hover in the pane with no visible supply lines. The EL element, in a configuration cited in EP 0 267 331 A1, is configured in such a manner that, on both inner faces of the laminated pane, one of the two electrodes is applied as a transparent thin layer in each case and the light element is arranged therebetween next to the dielectric partition layer. The transparent electrodes of the EL element are preferably constructed from indium tin oxide (ITO) and the light-emitting layer is applied directly to this electrode.

U.S. Pat. No. 7,009,156 B2 discloses a heatable laminated pane which has an electrically controllable planar functional element, for example, an EL element, and at least one electrically conductive thin film which forms a planar electrode of the planar functional element. Owing to the heatability of the laminated pane, according to U.S. Pat. No. 7,009,156 B2, it is possible to prevent undesirable deviations of the optical properties of the planar functional element, for example, the EL element. The EL element is constructed in a compact manner with an integrated counter-electrode and consequently has no electrically conductive and transparent coating of a second glass element.

DE 102 551 99 A1 discloses a method for producing an EL light element, a thin layer system being applied to a substrate in order to form a transparent surface electrode and in succession thereon, by means of screen printing, an EL light layer and at least a second surface electrode. The EL element is consequently constructed on a transparent thin layer electrode which already comprises at least a portion of the dielectric partition layer of the EL element. Between the actual electrically conductive electrode layer and the EL light layer, there is arranged at least one dielectric (part) layer.

WO 2005/104625 A1 discloses an illumination layer system having a first electrode on a glass substrate and a second electrode thereabove, which are both constructed in the form of electrically conductive layers or part-layers. At least one of the electrodes is transparent in the range of visible light and at least one electroluminescent layer is provided between the first and second electrode. The at least one electroluminescent layer is a screen printed electroluminescent layer and the second electrode is formed by an electrically conductive screen printed layer.

In numerous EL elements known from the prior art, there are used alternating-current voltage thick-film electroluminescence light structures, in particular based on zinc sulphide-containing EL pigments, so-called ZnS thick-film AC-EL elements. The thick-film electroluminescence light structures are produced according to the prior art by the second electrode present in the EL light structures being applied to the EL structure by means of screen printing or other printing techniques or by means of PVD methods, the second electrode being able to be transparent or opaque or non-transparent. The reason for this, on the one hand, involves the relatively large zinc sulphide-containing EL pigments available with a $d_{50}$ value of generally from 20 to 30 µm with a corresponding pigment size distribution and consequently a relatively thick EL layer in the range from 20 to 50 µm with uneven portions, for example, owing to EL pigments of different sizes, agglomerated EL pigments and/or two or more EL pigments which are arranged one above the other. Owing to this relatively uneven EL layer, a good insulation layer or dielectric layer is required. When screen printing layers are used, two of them are therefore often produced since, in particular with the screen printing method, the smallest air or gas bubbles, so-called microbubbles, cannot always be prevented and the necessary alternating-current voltage of generally from 100 to 200 Volt at network frequencies of from 50 Hz to 800 Hz and far beyond results in a high requirement in terms of dielectric strength.

However, the insulating layer(s) may be dispensed with if the light layer has a layer thickness which prevents a short-circuit between the two electrodes.

Owing to the arrangement of the second electrode directly on the insulating or dielectric layer and the EL layer, an electrode spacing which is uniform in two dimensions is generally ensured and consequently a uniform EL emission is produced. The frequent use of float glass, tempered safety glass (TSG) or partially tempered glass (TVG) in laminated glass, in particular laminated safety glass (LSG), and the use of laminated glass having electrically conductive coated surfaces as opposing electrode substrates brings about an undulation with a glass substrate of corresponding size. Each uneven portion presents a problem with respect to the formation of a uniform alternating electrical field and brings about a non-uniform EL emission.

Laminated glass, in particular laminated safety glass constructions, owing to the undulation or uneven nature, are constructed with relatively thick layers of polymer adhesive agents which are at least approximately 0.38 mm thick and, if a high level of strength is required, in most cases with layers which are at least 0.76 mm thick. The layers of adhesive agent may be, for example, of polyvinyl butyral.

However, an insulating layer which is 0.38 mm thick with an EL capacitor construction would require extremely high levels of voltage since, already with an electrode spacing of from 40 to 100 μm, an EL alternating-current voltage of generally from 100 to 200 Volt is required.

With small glass substrate dimensions and thin glasses which are only 1 or 2 mm thick, the problem of the non-uniform electrode spacing is not as significant as in window and cladding panels which cover a large surface-area.

The object of the present invention is to provide a laminated glass element, in particular a laminated safety glass element with a light effect based on an electroluminescence system which is operated with alternating current. Using the electroluminescence system, the smallest possible number of additional layers is intended to be incorporated in the laminated glass, that is to say, the layers present in the laminated glass are intended to be used at the same time as layers for the electroluminescence system. This laminated glass element, should also have a uniform EL emission with large dimensions (glass elements with a large surface-area) and be suitable for use as a decorative element and/or light element in interior spaces and/or external areas. This object is achieved with a laminated glass element, preferably a laminated safety glass element, with an integrated electroluminescence light structure, comprising:

a) a first at least partially transparent substrate A which has an inner side and an outer side and which is electrically conductive owing to coating on the inner side and consequently constitutes a first electrode A, b) an at least partially transparent polymer adhesive agent B of a plastics material, which preferably has a relative dielectric constant of at least 30 measured at 1 kHz and which is arranged at the inner side of the first at least partially transparent substrate adjacent to the coating, c) at least one electroluminescence light structure C which is arranged on the polymer adhesive agent at the inner side of the first at least partially transparent substrate, the at least one electroluminescence light structure being able to be arranged over the entire surface of the first at least partially transparent substrate or on one or more part-surfaces of the first at least partially transparent substrate, d) a second at least partially transparent substrate D which has an inner side and an outer side and which is arranged adjacent to the at least one electroluminescence light structure and which is electrically conductive owing to coating at the inner side, the inner side of the second at least partially transparent substrate D being arranged in the direction towards the inner side of the first at least partially transparent substrate, the second at least partially transparent substrate consequently constituting a second electrode D.

The laminated glass element, owing to the plane-parallel base substrate predetermined by the laminated glass system, is characterised by a uniform electrode spacing and consequently by a uniform EL emission.

In the laminated glass element according to the invention, the structures which are present in laminated glass elements are used in order to integrate at least one EL light structure, that is to say, the glass panes generally present in laminated glass elements are, after appropriate coating, used as electrodes and the polymer adhesive agent (adhesive intermediate layer) can be used as an insulator.

The term "at least partially transparent", in the context of the present application, is intended to refer to a substrate which has a transmission of at least 60%. The term transparent is intended to refer to substrates which have a transmission of at least 90%.

The term "laminated glass" is known to the person skilled in the art. A laminated glass is generally a laminate having at least two glass or, less often, plastics material panes which are connected by means of a transparent adhesive intermediate layer (polymer adhesive agent, composite mass) of plastics material, for example, casting resin or a highly tear-resistant viscoplastic thermoplastic composite film. Conventional thermoplastic composite films are constructed, for example, from polyvinyl butyral (PVB), ethylene vinyl acetate (EVA), polyacrylate (PA), polymethyl methacrylate (PMMA), polyurethane (PEI), polyvinyl alcohol (PVA) or polyvinyl chloride (PVC), with polyvinyl butyral (PVB) being used in most cases. The refraction index of the adhesive intermediate layer is generally greater than 1 and less than 2, preferably in the region of 1.5.

"Laminated safety glass" (LSG) is a special form of laminated glass, which complies with minimum legal requirements. Depending on the requirements, it is possible to vary, for example, the number of panes, pane thickness and thickness of the adhesive intermediate layer or the thickness of the film when a composite film is used. As glass or plastics material panes, it is possible to use, for example, float glass, tempered safety glass (TSG) or partially tempered glass.

The production of laminated glass and laminated safety glass is generally carried out under clean room conditions. In an autoclave, glass (or plastics material) and intermediate layer (generally film) are melted under heat with pressure to form an inseparable unit.

The materials cited above with respect to the construction of the laminated glass or laminated safety glass and the production method set out above can also be used in principle in the laminated glass element according to the invention or for the production thereof. Preferred materials and production methods relating to the laminated glass element according to the invention are set out below.

First Electrode A, Second Electrode D

At Least Partially Transparent Substrate

As an at least partially transparent substrate of the electrodes A and D, it is possible to use any at least partially transparent substrate which is suitable for the production of laminated glass, in particular for the production of laminated safety glass (LSG). Generally, glass or transparent plastics material is used as an at least partially transparent substrate. Appropriate transparent plastics materials are known to the person skilled in the art. Examples include Plexiglas® and polycarbonate.

Preferably, the at least partially transparent substrate involves glass substrates, preferably float glass, tempered safety glass (TSG) or partially tempered glass (TVG).

The glass thickness is dependent on the application and may differ in the first electrode A and the second electrode D. Conventional thicknesses generally range from 1 mm to 25 mm. Specific configurations in which the laminated glass element according to the invention can be used are set out below.

For example, modern window constructions use two or more glass panes with uniform or non-uniform spacing comprising flat glass, also referred to as float glass, with a thickness of generally from 1 mm to 21 mm, preferably from 3 mm to 8 mm. The spacing of the glass panes is generally from 12 mm to 16 mm.

The configurations may be constructed in accordance with the characteristics required, for example, for heat-protection, sun-protection, sound-proofing, fire-protection, protection of persons and objects or combinations thereof. It may be advantageous, for example, for exterior applications in building claddings, in addition to the normal UV filtering of glass substrates from approximately 380 nm, to provide an additional UV protection layer F at the outer side of the electrode A and/or the electrode D, this layer also having a UV-filter effect if the electrode layer A or D is constructed in an appropriate manner.

The laminated glass element according to the invention is particularly suitable for use in glass elements having a large surface-area (large dimensions) and provides a uniform EL. Conventional dimensions generally range from 0.5 m to 10 m (height and width). These dimensions are set out purely by way of example. It is also possible to use the laminated glass element according to the invention in glass elements having larger or smaller dimensions.

A conventional flat glass measurement appropriate according to the invention is, for example, 6.00×3.21 metres. The panes for typical multi-pane insulating glass structures are, for example, produced therefrom, hermetically sealed intermediate spaces being produced by the edge bond in insulating glass structures and conventionally being filled with an inert gas, the gas pressure being adjusted in accordance with the barometric air pressure at the location and time of production. At the time of production, there is therefore equilibrium between the pressure in the glazing unit and the external barometric pressure in the production environment.

A further aspect of the present invention is an insulating glass element which has at least one laminated glass element according to the invention, preferably a laminated safety glass element. The construction of insulating glass elements is known to a person skilled in the art.

In countries which have significant temperature variations, insulating glass constructions are a necessary and conventional energy saving means. One possible insulating glass construction comprises, for example, a laminated glass element according to the invention and an additional glass element.

An insulating glass composition may be constructed according to the prior art, for example, using a spacer, for example, of an aluminium or steel profile, and a so-called secondary sealing, which connects the laminated glass element according to the invention or an additional glass element to a third glass element in a permanently resilient manner by means of the spacer. Owing to an edge bond, a hermetically sealed intermediate space is produced which can conventionally be filled with an inert gas, the gas pressure being adjusted in accordance with the barometric air pressure at the location and at the time of production or in accordance with the barometric air pressure at the location of use. Alternatively, a valve may be provided with which the gas pressure can be adjusted in situ in an optimum manner.

The spacer profiles are generally filled with drying agents which are connected to the above-mentioned intermediate space by means of openings and which are intended to adsorb any water vapour which may be introduced so that the service life of the insulating glass element is increased.

In principle, the glass elements of the insulating glass element can be formed from simple float glass or from white glass which has a low level of iron oxide or from a tempered safety glass, laminated safety glass or partially tempered glass element. All the glass surfaces may be provided with various heat-protecting, light-absorbing, light-reflecting and/or scratch-resistant and/or easy-to-clean coatings or with coatings having an additional function.

The insulating glass element may also be formed with two intermediate spaces, that is to say, with a third glass element.

As mentioned above, in addition to dual, triple or multiple insulating glass structures of simple float glass, it is consequently also possible to produce such multi-pane insulating glass structures from panes which have a coating at one side or at both sides and consequently influence reflection and/or transmission in desired wavelength ranges of the light. Furthermore, the individual panes can be constructed so as to be tempered or coloured, or may be formed from so-called tempered safety glass (TSG) or from partially tempered glass (TVG).

For insulating glass systems, the so-called k value is also significant. The heat transfer value k indicates how much energy, expressed in Watts per square metre of glass surface-area and degrees of temperature difference in Kelvin ($W/m^2K$), is lost. A low k value indicates a smaller energy loss. Conventional k values for tempered glasses of a few millimetres' thickness range from 5 to 6 $W/m^2K$, whilst modern insulating glass structures comprising, for example, 4 mm float glass and 16 mm argon gas and 4 mm float glass reach k values in the range from 1.7 to 1.1 $W/m^2k$, depending on the type of coating.

Electrically Conductive Coating

According to the invention, the first and the second at least partially transparent substrates are rendered electrically conductive by means of coating on their respective inner sides. This may be carried out in accordance with all the methods known to the person skilled in the art. Suitable methods are set out below.

Glasses and plastics material films which are coated in an electrically conductive and substantially transparent manner have become widely used in industry. The functions of substrates of this type with electrically conductive transparent thin layers range from cover electrodes in liquid crystal display elements, so-called liquid crystal displays (LCD's), thin film transistor (TFT) displays, cover electrodes for electroluminescence displays, computer screen elements to electrostatic shielding elements, heating elements for mirrors and intruder alarm glazing and the like.

Preferably, the electrically conductive coating is an electrically conductive, at least partially transparent, preferably inorganic thin film, which is preferably applied to the first and the second at least partially transparent substrate by means of a sputter method, deposition method, by means of a vacuum or in a pyrolytic manner. Subsequently, it is possible to carry out a thermal processing operation, for example, at from 450 to 750° C.

On thermoplastic films or plates, it is possible to use both low-temperature sputter and deposition methods and indium tin oxide (ITO) or tin oxide (NESA) pastes or other metal oxides which are known to the person skilled in the art and which are embedded in a corresponding polymer matrix. Furthermore, it is possible to use pastes with intrinsically conductive polymers or electrically conductive polymer films, such as polyaniline, polythiophene, polyacetylene, polypyrrole (Handbook of Conducting Polymers, 1986) with and without metal oxide filling.

These are applied to the substrate, for example, by means of screen printing, doctor blading, injection, spraying, brushing, with a drying operation preferably being carried out subsequently at low temperatures of, for example, from 80 to 120° C.

In a preferred configuration, the application of the electrically conductive coating is carried out by means of a vacuum or in a pyrolytic manner.

In a particularly preferred manner, the electrically conductive coating is a thin and substantially transparent metal or metal oxide layer which is produced by means of a vacuum or in a pyrolytic manner and which preferably has a surface-area resistance of from 5 milliohm to 3000 Ohm per square, in a particularly preferred manner, a surface-area resistance of from 0.1 to 1,000 Ohm/square, in a quite particularly preferred manner from 5 to 30 Ohm/square and, in another preferred configuration, a daylight permeability of at least 60% and in particular at least 76%.

A particular preferred type of electrically conductive and highly transparent glass, in particular float glass, involves layers which are produced in a pyrolytic manner and which have a high level of surface hardness and whose electrical surface-area resistance can be adjusted in a very wide range of from generally a few milliohm to 3000 Ohm per square. The daylight permeability is generally from 77 to 86%. TEC® glass from the company Pilkington Libbey-Owens-Ford, Toledo Ohio, USA is cited in this instance by way of example.

A glass with the reference TEC® 15/4 has glass 4 mm thick and provides a surface-area resistance of less than 14 Ohm per square with a daylight permeability of 83%.

A glass with the reference TEC® 70/4 also has glass 4 mm thick and provides a surface-area resistance of less than 80 Ohm per square with a daylight permeability of 82%.

Such glasses which are coated in a pyrolytic manner can be readily shaped and have good scratch resistance, in particular scratches do not lead to an electrical interruption of the electrically conductive surface layer but instead only to a mostly slight increase of the surface-area resistance.

Furthermore, conductive surface layers which are produced in a pyrolytic manner are diffused into and anchored in the surface to such a high degree by the heat-processing operation that, with subsequent material application, an extremely high level of adhesive-bonding is achieved with respect to the glass substrate, which is also very advantageous for the present invention. In addition, coatings of this type have a good level of homogeneity, that is to say, a low level of variation of the surface-area resistance value over large surfaces. This characteristic also constitutes an advantage for the present invention.

Electrically conductive and highly transparent thin layers can be produced on a glass substrate which is preferably used in accordance with the invention in a much more efficient and cost-effective manner than on polymer substrates, such as PET or PMMA or PC. The electrical surface-area resistance with glass coatings is on average 10 times more favourable than on a polymer film with a comparable level of transparency, that is to say, for example, from 3 to 10 Ohm/square for glass layers compared with from 30 to 100 Ohm/square on PET films. The production of the second transparent electrode using a vacuum process or screen printing on a glass substrate which is already constructed in a manner specific to the customer and application is also considerably more complex and costly than using a glass substrate with a conductive coating according to a preferred configuration of the present invention.

Conductor Paths, Connections of the Electrodes

In the case of large surface-area light elements having a light capacitor structure, the surface conductivity is significant for a uniform luminance. In the case of large surface-area light elements which are preferably intended to be produced according to the invention using the laminated glass element according to the invention, so called busbars are often used, in particular with semi-conductive LEP or OLED systems in which relatively high levels of current flow. Conductor paths which have a very good level of electrical conductivity are thereby produced in the manner of a cross. In this manner, for example, a large surface-area is divided into four small surface-areas. Consequently, the voltage drop in the central region of a light surface is significantly reduced and the uniform nature of the luminance or the reduction in the brightness in the centre of a light field is reduced.

With a zinc sulphide-containing particular EL field which is used in one configuration according to the invention, an alternating-current voltage of generally from greater than 100 Volt to above 200 Volt is applied and, when a good dielectric is used or good insulation, very low levels of current flow. Consequently, with a ZnS thick-film AC-EL element which is preferably used according to the invention, the problem of current load is significantly less than in semi-conductive LED or OLED systems so that it is not absolutely necessary to use busbars, but instead large surface-area light elements can also be provided without the use of busbars.

The electrical connections can be produced, for example, using pastes which are electrically conductive and which can be burnt in with tin, zinc, silver, palladium, aluminium and other suitable conductive metals or combinations and admixtures or alloys thereof.

The electrically conductive contact strips are generally applied to the electrically conductive and at least partially transparent thin coatings by means of screen printing, brush application, inkjet, doctor blade, roller, by means of injection, spraying or by means of dispenser application or comparable application methods known to a person skilled in the art and subsequently generally thermally processed in an oven so that strips which are generally applied laterally along a substrate edge can be correctly contacted in an electrically conductive manner by means of soldering, clamping, adhesive-bonding, crimping, or insertion.

Preferably, the electrically conductive coating is provided, at least at one glass edge, with a correctly conducting metal strip which is some 1 to 10 mm wide. This strip is preferably applied using a printing method by means of screen printing or brush application, inkjet, doctor blade, roller, by means of spraying with a spray head or by means of dispenser application or comparable application methods known to a person skilled in the art (as mentioned above), dried and subjected to a thermal processing operation, a contact strip which can be soldered being obtained.

In another configuration, at least two glass edges are arranged so as to be offset in such a manner that a contact strip is arranged in an exposed manner and can thus correctly be provided with connection elements by means of soldering or clamping or spring contact or friction welding or ultrasound contacting.

A glass element which is preferred according to the invention with an electroluminescent effect based on electrically conductive and at least partially transparent coatings generally requires the best possible electrically conductive contact strips or so-called busbars, it not being strictly necessary—as already mentioned above—to use busbars.

As long as only low levels of electrical power have to be conducted via electrically conductive coatings, spring contacts or carbon-filled rubber elements or so-called zebra rubber strips are sufficient.

As conductive adhesive pastes, conductive adhesive pastes based on polymer adhesive agents filled with silver, palladium, copper or gold are used. It is also possible to apply self-adhesive electrically conductive strips, by means of pressing, for example, of tin-plated copper film with an adhesive which is electrically conductive in the z-direction.

The adhesive layer is generally pressed in a uniform manner with a few N/cm$^2$ of surface pressure and, depending on the configuration, values are achieved of 0.013 Ohm/cm$^2$ (for example, Conductive Copper Foil Tape VE 1691 from the company D & M International, A-8451 Heimschuh) or 0.005

Ohm (for example, type 1183 from the company 3M Electrical Products Division, Austin, Tex. USA; according to MIL-STD-200 Method 307 maintained at 5 psi/3.4 N/cm² measured over 1 sq. in. surface area) or 0.001 Ohm (for example, Type 1345 from the company 3M) or 0.003 Ohm (for example, Type 3202 from the company Holland Shielding Systems BV).

Polymer Adhesive Agent B

The at least partially transparent polymer adhesive agent (adhesive intermediate layer, composite mass) B is constructed from a plastics material which preferably has a relative dielectric constant (permittivity) of at least 30 measured at 1 kHZ, in a particularly preferred manner, at least 50.

The term "dielectric constant" is known to the person skilled in the art. The dielectric constant is used as a complex variable with a real portion $\in_1$ (also $\in'$ or $\in_r$) and a notional portion $\in_2$ (also $\in''$ or $\in_i$). In these two components, the contributions of various mechanisms in the material (for example, strip transitions) can be stated directly and added together in accordance with their frequency. Using the Kramers/Kronig relationship, the (dispersing) connection between the complex dielectric constant and the optical parameters refractive index n and absorption coefficient k can then be set out. This then leads to the theoretical spectrums of absorption and reflection which can be compared with measured spectrums and adapted.

The relative dielectric constants can be established from both spectroscopic data and the co-operation with an externally applied electrical field in accordance with methods known to the person skilled in the art.

The polymer adhesive agent B is arranged at the inner side of the first at least partially transparent substrate A adjacent to the coating. It is possible for the polymer adhesive agent B to be arranged directly adjacent to the coating of the first at least partially transparent substrate A or for one or more additional layers to be arranged between the coating of the first at least partially transparent substrate A and the polymer adhesive agent. Both insulating layers may have the same construction or a different construction.

In the event of resistive conductivity, it is advantageous to incorporate an additional insulation in the laminated glass element according to the invention. In another configuration of the present invention, an insulating layer E is therefore arranged directly adjacent to the coating between the coating of the first at least partially transparent substrate A and the polymer adhesive agent. In another configuration, such an insulating layer may be arranged as an alternative to the first-mentioned insulating layer or in addition to the first-mentioned insulating layer directly adjacent to the coating of the second at least partially transparent substrate D.

Appropriate insulating layers E are known in the prior art and are often applied to electrically conductive coatings for reasons of passivation. These layers are generally constructed using the vacuum method or chemically in the form of thin and very highly transparent oxide-containing or nitride-containing layers. The thickness is generally from 50 nm to 500 nm. If two insulating layers are used in the laminated glass element according to the invention, the thickness of the individual insulating layers may be identical or different.

Insulating layers E of this type also provide good electrical insulation at high temperatures and further allow good adhesive bonding to the EL light structure C or to the polymer adhesive agent B and are generally very stable in chemical terms.

In another preferred configuration, the present invention consequently relates to a laminated glass element wherein the electrically conductive coating of the electrodes A and D is provided with a transparent and thin and insulating oxide-containing or nitride-containing insulating layer E at least in the region of the EL light structure.

When the laminated glass element according to the invention is produced, it should be taken into account in a preferred configuration that the insulating layers E which may be present in the region of the contact strips which are present in a preferred configuration of the invention (see conductor paths, connections of the electrodes) are removed. This is conventionally carried out by means of an etching process or prior to the coating of the electrodes A and D with the insulating layer E by the electrically conductive coatings in the region of the contact strips being masked or covered and the insulating layer E subsequently being applied. In principle, the insulating layer E can also be produced by means of conventional roller or curtain pouring or spray coating methods or by means of screen printing. As an insulating layer E, it is possible to select a transparent thin glass frit coating or a thin and transparent polymer coating.

The at least partially transparent polymer adhesive agent B is preferably a casting resin or a thermoplastic composite film, the thermoplastic composite film preferably being selected from the group comprising polyvinylbutyral (PVB), ethylene vinyl acetate (EVA), polyacrylate (PA), polymethyl methacrylate (PMMA), polyurethane (PU), polyvinyl alcohol (PVA) and polyvinyl chloride (PVC), preferably polvinylbutyral (PVB).

Suitable PVB films are known to the person skilled in the art and are commercially available, for example, Butacite®, Saflex®, S-Lec® and Trosifol®.

The thermoplastic composite films which are preferably used as polymer adhesive agents B generally have a thickness of from 100 μm to 1000 μm, preferably 380 μm or 760 μm. It is possible to use one or more, for example, two or three films.

If the polymer adhesive agent B is produced from a casting resin, the thickness may be selected to be significantly greater than in the films mentioned above. Suitable thicknesses for the polymer adhesive agent when casting resin is used are generally from 0.5 to 5.0 mm, preferably from 1 mm to 2 mm. Higher film thicknesses are in particular used with uneven glass surfaces, with large formats and/or with high demands in terms of the so-called residue carrying capacity.

As a polymer adhesive agent B, in a quite particularly preferred manner, a PVB film having a thickness of from 0.1 to 0.76 μm, preferably from 0.1 to 0.38 μm is used. Films of this type have a relative dielectric constant of generally from 3.5 to 5 and, after the lamination operation to produce a laminated glass element, are completely transparent. The thickness of generally from 0.1 to 0.38 μm is required according to experience with large surface-area lamination of two glass substrates in order to comply with official technical building safety standards, such as CFR 16 Part 1201 or ANSI 297.1 or the CEN standard EN 12600, for example, in vertical glazing, entrance doors, safety doors, sliding doors, bath and shower partition walls, in side lights and in glass panels.

In a preferred configuration of the present invention, the polymer adhesive agent B is constructed in such a manner that the relative dielectric constant measured at 1 kHz reaches at least the value of 30 and is preferably at least 50. As the relative dielectric constant (Epsilon) increases by a factor of 10 or preferably by substantially more than 10, the thickness of the polymer adhesive agent is accordingly reduced in an electrically similar manner and the EL supply voltage—as is conventional in EL systems—can generally be left at from 100 to 200 Volt AC. In order to comply with the dual insulation provisions owing to the relatively high levels of voltage, it is possible to integrate additional glass substrates and/or plastics material films in the polymer adhesive agent in the context of a lamination operation for laminated glass.

The increase of the dielectric constant of the polymer adhesive agent B can be carried out by adding functional particles in the polymer adhesive agent which is generally used for the production of laminated glass (suitable and preferred polymer adhesive agents are listed above).

The functional particles are preferably transparent particles which are electrically conductive. The functional particles preferably have a high dielectric constant.

As functional particles it is preferably possible to use nanoscale particles, nanoscale agglomerates, dendritic particles, submicrometre and micrometre-sized crystalline particles and/or combinations thereof. These generally have a mean particle diameter in the range from 0.5 µm to 5 µm, preferably from 0.5 µm to 3 µm, in a particularly preferred manner from 1 µm to 2 µm. Suitable particles are, for example, Single-Walled-Carbon-Nano-Tubes (so-called SWCNTs). The term "Single-Walled-Carbon-Nano-Tubes (SWCNTs) is intended to refer below to different variants of carbon nanotubes with a single wall which may also include nanofibres. Single-Walled-Carbon-Nano-Tubes are substantially mostly cylindrical carbon structures with a diameter of a few nanometres. The production of these Single-Walled-Carbon-Nano-Tubes is known to the person skilled in the art and reference can be made to corresponding methods of the prior art. These include, for example, catalytic chemical vapour deposition (CCVD).

These methods often provide fractions which differ in terms of diameter, length, chirality and electronic properties. They occur in a bundled state and are often mixed with a portion of amorphous carbon. The SWCNTs are separated based on these fractions.

The previously known separation methods for SWCNTs are based on electron transfer effects on metal SWCNTs which are processed with diazonium salts, on dielectrophoresis, on a specific chemical affinity of semi-conductive carbon nanotubes for octadecylamines and on carbon nanotubes which have been surrounded by single-strand DNA. The selectivity of these methods can be further improved by means of intensive centrifuging of pre-processed dispersions and use of ion exchange chromatography. In the context of the present invention, fraction-free Single-Walled-Carbon-Nano-Tubes are preferably used, that is to say, fractions of Single-Walled-Carbon-Nano-Tubes which differ with respect to one parameter selected from the group comprising diameter, length, chirality and electronic properties, by a maximum of 50%, particularly preferably a maximum of 40%, in particular a maximum of 30%, in particular a maximum of 20% and quite particularly a maximum of 10%.

The SWCNTs contained according to the invention are generally known and commercially available. The SWCNTs preferably have an outer diameter of between 1 nm and 50 nm, preferably between 3 nm and 25 nm, particularly preferably between 5 nm and 15 nm, and a length of between 1 µm and 100 µm preferably between 1 µm and 50 µm, particularly preferably between 1 µm and 10 µm. SWCNTs may be mixed as a pure material or containing master batch in thermoplastic plastics materials with the polymer adhesive agent B, preferably in a homogeneous manner. Single-walled carbon nanotubes (SWCNTs) are particularly preferred for the purposes of the present invention since they are thinner and have higher levels of conductive capacity, whereby the desired effect can already be achieved with a lower level of use.

The SWCNTs which may be used may be orientated or directed in any random manner.

Furthermore, it is also possible to use metal nanotubes, such as, for example, silver nanotubes. With regard to metal nanowires, reference is made to WO 2007/022226 A2 whose disclosure with respect to the nanowires which are disclosed therein is incorporated into the present invention by reference. The substantially transparent silver nanowires which have a good level of electrical conductivity as described in WO 2007/022226 A2 are particularly suitable for the present invention.

Examples of other suitable particles include barium titanate particles in the range preferably from 1.0 to 2.0 µm. With a high filling level, these may produce a relative dielectric constant of up to 100. Furthermore, ITO (Indium Tin Oxide) nanoparticles and/or substantially transparent and electrically conductive flakes can be added. In any case, it should be taken into account that the polymer adhesive agent B with the various functional particles dispersed in the polymer adhesive agent remains at least partially transparent.

The polymer adhesive agent may contain the particles mentioned above in a quantity of from 0 to 70% by weight, preferably from 0.5 to 30% by weight, particularly preferably from 1 to 20% by weight (with respect to the polymer adhesive agent used). The particles added to the polymer adhesive agent B are preferably added in such a concentration that, after the lamination operation of the laminated glass element, the percolation of the particles, that is to say, the electrical conductivity owing to direct electrical contacts of the individual particles added, at least in the regions between the individual light elements of the EL structure C does not lead to any resistive conductivity in the z direction of the polymer adhesive agent.

The present invention therefore also relates to a laminated glass element, the casting resin or the thermoplastic composite film forming a composite mass matrix to which substantially transparent elements in the form of nanoscale particles, nanoscale agglomerates, dendritic particles, submicrometre and micrometre-sized crystalline particles and combinations thereof are added. Suitable particle sizes, quantities and suitable particles are set out above.

In a particularly preferred configuration, the present invention consequently relates to a laminated glass element, the at least partially transparent polymer adhesive agent B being formed from a polyvinylbutyral (PVB) film of from 0.1 to 0.76 mm, preferably from 0.1 to 0.38 mm and, owing to the addition of substantially transparent elements in the form of nanoscale particles which have already been mentioned above, nanoscale agglomerates, dendritic particles, submicrometre or micrometre-sized crystalline particles or combinations of the particles mentioned, having a high relative dielectric constant of preferably at least 30, particularly preferably at least 50. An adequate level of electrical insulation is thereby brought about at the same time.

In another configuration, the present invention relates to a laminated glass element, the at least partially transparent polymer adhesive agent being a thermoplastic composite film which is interwoven with an electrically conductive metal fabric. Suitable metal fabrics are known to the person skilled in the art. The composite film preferably has a thickness of from 0.1 to 0.38 mm.

Electroluminescence Light Structure C

The at least one electroluminescence (EL) light structure C is arranged adjacent to the polymer adhesive agent at the inner side of the first at least partially transparent substrate A. The EL light structure C may be arranged directly adjacent to the polymer adhesive agent B or one or more additional layers may optionally be arranged between the polymer adhesive agent B and the EL light structure C. Preferably, the EL light structure C is arranged directly adjacent to the polymer adhesive agent B. The term "at the inner side of the first at least partially transparent substrate" is intended to be understood in the context of the present application in such a manner that the sequence and direction of the individual layers which form the laminated glass element according to the invention is described thereby and means in this instance that the first layer is formed by a first at least partially transparent substrate which is electrically conductive by means of coating at the inner side (first electrode A), the second layer is optionally an insulating layer E which is arranged on the coating of the electrode A, the layer following thereon (that is to say, on the coating of the electrode A or optionally the insulating layer E) is the polymer adhesive agent B and the EL light structure C is preferably arranged thereon. However, for manufacturing reasons, the EL light structure C will preferably be applied to the dimensionally-stable substrates with the electrode layers A or D thereof or the optional insulating layers E or F by means of screen printing, inkjet printing, dispenser application, injection, spraying, roller coating, curtain pouring and other similar coating or printing methods. The EL light structure C can therefore be printed or coated both on the inner side of the first substrate with the electrode A or optionally the insulating layer E or on the second substrate with the electrode D or optionally the insulating layer F.

The at least one electroluminescence (EL) light structure may be arranged on the entire inner face of the first or second at least partially transparent substrate or on one or more part-faces of the first at least partially transparent substrate. If the light structure is arranged on a plurality of part-faces, the part-faces generally have a mutual spacing of from 0.5 to 10.0 mm, preferably from 1 to 5 mm.

The EL light structure C is generally constructed from a binding agent matrix with EL pigments which are dispersed therein in a homogeneous manner. The binding agent matrix is generally selected so that a good level of adhesive-bonding is produced on the electrode layer C (or the insulation layer E which is optionally applied thereto) and a good level of adhesive-bonding is possible with the polymer adhesive agent B in a subsequent lamination operation. In a preferred configuration, PVB or PU based systems are used. In addition to the EL pigments, there may optionally also be other additives in the binding agent matrix, such as colour-converting organic and/or inorganic systems, colour additives for a day and night light effect and/or reflective and/or light absorbing effect pigments, such as aluminium flakes or glass flakes or mica platelets. Generally, the proportion of EL pigments in the entire mass of the EL light structure (filling level) is from 20 to 75% by weight, preferably from 50 to 70% by weight.

Preferably, the at least one EL light structure C is an alternating current thick-film powder electroluminescence (AC-P-EL) light structure.

Thick-film AC EL systems have been well known since Destriau in 1936 and are most often applied to ITO-PET films by means of screen printing. Since zinc sulphide-containing electroluminophores have a very high level of degradation in operation, and in particular at relatively high temperatures and a water vapour environment, microencapsulated EL pigments (also referred to as EL phosphors) are nowadays generally used for long-life thick-film AC EL lamp structures. However, it is also possible to use non-microencapsulated pigments in the laminated glass structure as will be set out in greater detail below.

EL films or EL lamps or EL elements, in the context of the present application, are intended to refer to thick-film EL systems which are operated with alternating-current voltage at normative 100 Volt and 400 Hertz and thus emit a so-called cold light of from a few $cd/m^2$ to a few 100 $cd/m^2$. In such inorganic thick-film alternating-current voltage EL elements, EL screen printing pastes are generally used.

Such EL screen printing pastes are generally constructed based on inorganic substances. Suitable substances are, for example, highly pure ZnS, CdS, $Zn_xCd_{1-x}S$ compounds of the groups II and IV of the periodic system of elements, with ZnS being used in a particularly preferred manner. The substances mentioned above can be doped or activated and optionally also coactivated. For doping, copper and/or manganese are used, for example. The coactivation is carried out, for example, with chlorine, bromine, iodine and aluminium. The content of alkali and rare-earth metals is generally very low in the substances mentioned above, if they are present at all. Most particularly preferably, ZnS is used and is preferably doped or activated with copper and/or manganese and preferably coactivated with chlorine, bromine, iodine and/or aluminium.

Conventional EL emission colours are yellow, orange, green green-blue, blue-green and white, the emission colour white or red being able to be achieved by means of admixtures of suitable EL pigments or by means of colour conversion. The colour conversion can generally be carried out in the form of a converting layer and/or the addition of corresponding dyes and pigments in the polymer binders of the screen printing colours or the polymer matrix in which the EL pigments are incorporated.

In another configuration of the present invention, the polymer adhesive agent B and/or the screen printing matrix which is used to produce the EL light structure is/are provided with glazing, colour-filtering or colour-converting dyes and/or pigments. In this manner, an emission colour of white or a day/night light effect can be generated.

In another configuration, pigments are used in the EL light structure C and have an emission in the blue wavelength range from 420 to 480 nm and are provided with a colour-converting microencapsulation. In this manner, the colour white may be emitted.

In one configuration, AC-P-EL pigments are used as pigments in the EL light structure C and have an emission of from 420 to 480 nm in the blue wavelength range. In addition, the AC-P-EL screen printing matrix preferably has wavelength-converting inorganic fine particles based on Europium (II) activated earth-alkaline orthosilicate phosphors such as $(Ba, Sr, Ca)_2SiO_4:Eu^{2+}$ or YAG phosphors such as $Y_3Al_5O_{12}:Ce^{3+}$ or $Tb_3Al_5O_{12}:Ce^{3+}$ or $Sr_2GaS_4:Eu^{2+}$ or $SrS:Eu^{2+}$ or $(Y,Lu,Gd,Tb)_3(Al,Sc,Ga)_5O_{12}:Ce^{3+}$ or $(Zn,Ca,Sr)(S,Se):Eu^{2+}$. In this manner, it is possible to achieve a white emission.

According to the prior art, the EL pigments mentioned above may be microencapsulated. Owing to the inorganic microencapsulation technology, it is possible to achieve good half-life periods. In this instance, the EL screen printing system Luxprint® for EL from the company E.I. du Pont de Nemours and Companies is cited by way of example. Organic microencapsulation technologies and film shell type laminates based on various thermoplastic films are in principle also suitable but have been found to be costly and not to significantly extend the service life.

Suitable zinc sulphide-containing microencapsulated EL pigments are provided by the company Osram Sylvania, Inc. Towanda, under the trade name GlacierGLO™ Standard, High Brite and Long Life and from the company Durel Division of the Rogers Corporation, under the trade names 1PHS001® High-Efficiency Green Encapsulated EL Phosphor, 1PHS002® High-Efficiency Blue-Green Encapsulated EL Phosphor, 1PHS003® Long-Life Blue Encapsulated EL Phosphor, 1PHS004® Long-Life Orange Encapsulated EL Phosphor.

The mean particle diameters of the suitable microencapsulated pigments in the EL light structure are generally from 15 to 60 µm, preferably from 20 to 35 µm.

In the present invention inorganic glasses are preferably used as at least partially transparent substrates. These provide an outstanding barrier to water vapour and oxygen. It is therefore also possible to use, in the EL light structure C of the laminated glass element according to the invention, non-microencapsulated fine-grain EL pigments, preferably with a long service life. Suitable non-microencapsulated fine-grain zinc sulphide-containing EL pigments are disclosed, for example, in U.S. Pat. No. 6,248,261 and in WO 01/34723. These preferably have a cubic crystal structure. The non-microencapsulated pigments preferably have mean particle diameters of from 1 to 30 µm, in a particularly preferred manner from 2 to 15 µm, in a quite particularly preferred manner from 5 to 10 µm.

Specially non-microencapsulated EL pigments can be used with smaller pigment dimensions up to below 10 µm. It is thereby possible to increase the transparency of the glass element.

Consequently, it is possible to add non-encapsulated pigments to the screen printing dyes suitable according to the present application, preferably with the specific hygroscopic properties of the pigments being taken into account, preferably the ZnS pigments. Binding agents are generally used which on the one hand have a good level of adhesion to so-called ITO layers (Indium Tin Oxide) or which have inherently conductive transparent polymer layers and further provide good insulation, increase the dielectric and consequently bring about an improvement of the dielectric strength with high electrical field strengths and in the hardened state further have a good water vapour block and additionally protect the light pigments and increase the service-life.

In one configuration of the present invention, pigments which are not microencapsulated are used in the at least one AC-P-EL light structure.

The half-life periods of the suitable pigments in the laminated glass elements having the EL light structure C, that is to say, the time within which the initial brightness of the laminated glass element according to the invention has decreased by one half, are generally 100 or 80 Volt and 400 Hertz for up to a maximum of 5000 hours, but generally no longer than from 1000 to 3500 hours. The half-life period of the laminated glass elements according to the invention with an EL light structure is high since the glass substrates which are preferably used for the laminated glass element according to the invention, together with the polymer adhesive agent B very effectively protect electroluminophores against the effect of water vapour.

The brightness values (EL emission) are generally from 1 to 200 cd/m$^2$, preferably from 3 to 100 cd/m$^2$, in a particularly preferred manner from 5 to 40 cd/m$^2$; with large light surface-areas, the brightness values are preferably in the range from 1 to 100 cd/m$^2$.

However, pigments with longer or shorter half-life periods and higher or lower brightness values can also be used in the EL structures of the laminated glass element according to the invention.

The layer contains the above-mentioned ZnS crystals which may optionally be doped, preferably microencapsulated as described above, preferably in a quantity of from 40 to 90% by weight, preferably from 50 to 80% by weight, particularly preferably from 55 to 70% by weight with respect to the weight of the paste in each case. As a binding agent, it is possible to use single and preferably dual component polyurethane. Preferred according to the invention are highly flexible materials from Bayer MaterialScience AG, for example, the coating raw materials from the Desmophen and Desmodur ranges, preferably Desmophen and Desmodur, or the coating raw materials from the Lupranate, Lupranol, Pluracol or Lupraphen ranges from BASF AG. As a solvent, it is possible to use ethoxypropylacetate, ethylacetate, butylacetate, methoxypropylacetate, acetone, methyl ethyl ketone, methylisobutylketone, cyclohexanone, toluol, xylol, solvent naphtha 100 or any admixtures of two or more of these solvents in quantities of preferably from 1 to 50% by weight, more preferably from 2 to 30% by weight, particularly preferably from 5 to 15% by weight, with respect to the overall paste mass in each case. Furthermore, other highly flexible binding agents may be, for example, those based on PMMA, PVA, in particular Mowiol and Poval from Kuraray Europe GmbH (now called Kuraray Specialties) or Polyviol from Wacker AG, or PVB, in particular Mowital from Kuraray Europe GmbH (B 20H, B 30 T, B 30H, B 30 HH, B 45H, B 60 T, B 60H, B 60 HH, B 75 H), or Pioloform, in particular Pioloform BR18, BM18 or BT18, from Wacker AG. When polymer binding agents are used, such as, for example, PVB, it is also possible to add solvents such as methanol, ethanol, propanol, isopropanol, diacetone alcohol, benzyl alcohol, 1-methoxypropanol-2, butylglycol, methoxybutanol, dowanol, methoxypropylacetate, methylacetate, ethylacetate, butylacetate, butoxyl, glycolic acid-n-butylester, acetone, methyl ethyl ketone, methylisobutylketone, cyclohexanone, toluol, xylol, hexane, cyclohexane, heptane and admixtures of two or more of the above in quantities of from 1 to 30% by weight with respect to the total mass of the paste, preferably from 2 to 20% by weight, particularly preferably from 3 to 10% by weight.

Furthermore, from 0.1 to 2% by weight of additives may be contained in order to improve the flow behaviour and the movement. Examples of levelling agents include Additol XL480 in butoxyl in an admixture ratio of from 40:60 to 60:40. As additional additives, it is also possible to have a content of from 0.01 to 10% by weight, preferably from 0.05 to 5% by weight, particularly preferably from 0.1 to 2% by weight, with respect to the total mass of paste in each case, of rheology additives which reduce the settling behaviour of pigments and fillers in the paste, for example, BYK 410, BYK 411, BYK 430, BYK 431 or any admixtures thereof.

According to the invention, particularly preferred formulations of printing pastes for producing the EL light structure C contain:

| Substance | Content/ % by weight | Content/ % by weight | Content/ % by weight | Content/ % by weight |
|---|---|---|---|---|
| Pigment (Osram Sylvania) | 55.3 | 69.7 | 64.75 | 65.1 |
| Desmophen D670 (BMS) | 18.5 | 11.9 | 12.7 | 13.1 |
| Desmodur N75 MPA (BMS) | 16.0 | 9.0 | 12.4 | 11.3 |
| Ethoxypropylacetate | 9.8 | 9.1 | 9.9 | 10.2 |
| Additol XL480 (50% by weight in butoxyl) | 0.4 | 0.3 | 0.25 | 0.3 |

| Substance | Content/ % by weight | Content/ % by weight | Content/ % by weight |
| --- | --- | --- | --- |
| Pigment (Osram Sylvania) | 61.2 | 65.1 | 69.7 |
| Desmophen D670 (BMS) | 15.2 | 12.7 | 11.9 |
| Desmodur N75 MPA (BMS) | 13.1 | 11.4 | 9.0 |
| Methoxypropylacetate | 10.2 | 5.5 | 4.9 |
| Ethoxypropylacetate | 0 | 5 | 4.2 |
| Additol XL480 (50% by weight in butoxyl) | 0.3 | 0.3 | 0.3 |

| Substance | Content/ % by weight | Content/ % by weight |
| --- | --- | --- |
| Pigment (Osram Sylvania) | 61.2 | 69.7 |
| Desmophen 1800 (BMS) | 17.7 | 14.1 |
| Desmodur L67 MPA/X (BMS) | 9.9 | 7.9 |
| Ethoxypropylacetate | 10.8 | 8.0 |
| Additol XL480 (50% by weight in butoxyl) | 0.4 | 0.3 |

Furthermore, it is also possible to use commercially available, ready-mixed screen printing pastes, such as those from the manufacturer Metalor or Norcote.

Generally, the EL screen printing pastes mentioned above are applied to transparent plastics material films or glasses which in turn have a substantially transparent electrically conductive coating and thereby constitute the electrode for the visible side (in the present laminated glass element according to the invention, the electrode mentioned corresponds to electrode D, the EL light structure optionally being applied to the insulating layer E which may be provided). Subsequently, the dielectric (polymer adhesive agent B) and the rear side electrode (in the present laminated glass element according to the invention, the electrode A) are produced using technical printing and/or lamination methods.

However, the reverse production process is also possible, with the rear side electrode (in the present laminated glass element according to the invention, the electrode A) being produced first or the rear side electrode being used in the form of a metal coated film and the dielectric (polymer adhesive agent B) being applied to this electrode—optionally after the insulating layer E has been applied. Subsequently, the EL screen printing paste (EL light structure C) and afterwards the transparent and electrically conductive upper electrode A is applied. The system obtained can subsequently optionally be laminated with a transparent covering film and consequently be protected from water vapour and also mechanical damage.

The EL light structure C is generally applied using technical printing methods by means of screen printing or dispenser application or inkjet application or also by means of a doctor blading operation or a roller coating method or a curtain pouring method or a transfer method, preferably by means of screen printing. Preferably, the EL light structure is applied to the surface of the electrode D or the insulating layer E which is optionally applied to the electrode D.

A further aspect of the present application is a method for producing the laminated glass element according to the invention, the at least one electroluminescence light structure C being applied to the adhesive agent B by means of screen printing. In a particularly preferred manner, AC-P-EL pigments are dispersed in a PVB matrix and applied by means of screen printing in a graphically configured manner.

In another configuration, the PVB which is used as a binding agent is produced with the pigments, preferably AC-P-EL pigments, and together with particles which increase the relative dielectric constant, by means of extrusion or casting technology. Suitable particles which increase the dielectric constant are the particles which are mentioned with respect to the polymer adhesive agent B and which increase the dielectric constant.

In another configuration, the PVB which is used as a binding agent is produced by means of co-extrusion and the pigments, preferably AC-P-EL pigments without the particles which increase the dielectric constant, are extruded in a PVB layer onto a PVB layer with the particles which increase the dielectric constant.

Preferably, the at least one electroluminescence light structure is arranged in a graphically configured manner. In a particularly preferred manner, the graphically configured electroluminescence light structure is formed from a plurality of light elements, the individual light elements being formed from any symbols, preferably dots, rectangles, triangles, squares, lines, circles, stars, figures and/or letters which are arranged in a geometrically precise or random manner adjacent to the at least partially transparent polymer adhesive agent B. A precise arrangement in the context of the present application is intended to refer, inter alia, to an arrangement in the form of numerals, figures, text or logos. Furthermore, a precise arrangement is intended to refer to a regular arrangement. The size of the individual light elements is generally a few mm, preferably from 1 to 10 mm.

The light elements of the at least one EL light structure and/or—when more than one electroluminescence light structure is used—the electroluminescence light structures may have the same or different emission colours. The light elements of the at least one EL light structure and/or—when more than one electroluminescence light structure is used—the electroluminescence light structures preferably have different emission colours. Appropriate emission colours are set out above.

In one configuration of the present invention, the laminated glass element according to the invention may be transparent at least in regions or in parts when the light structure is not switched to the electrically activated state.

In another configuration of the present invention, the pigments present in the EL light structure C have such a small mean particle diameter or such a low filling level in the EL light structure or in the individual light element, or the individual light elements are geometrically constructed to be so small or the spacing of the individual light elements is selected to be so large that the laminated glass element is configured to be at least partially transparent, or a transparency is ensured when the light structure is not electrically activated. Suitable pigment particle diameters, filling levels, dimensions for light elements and spacings for light elements are set out above.

In another configuration of the present invention, the light structure is configured in such a manner that, in the electrically active and light-emitting state, owing to the Lambertian beam characteristic of an individual light element, there is no transparency through the glass element.

Production Method

The laminated glass element according to the invention or the insulating glass element according to the invention may be produced according to methods known to the person skilled in the art.

With regard to the production of the individual components of the laminated glass element and the application of the individual layers, reference is made to the methods set out in the above description. From the components of the laminated glass element, after application of the desired layers, the laminated glass element according to the invention is generally obtained by means of lamination. Suitable methods for lamination are known to a person skilled in the art and are generally carried out according to the prior art with a prelamination and a lamination operation in an autoclave.

Another aspect of the present invention is therefore a method for producing a laminated glass element according to the invention, a composite layer comprising the components A, B, C and D and optionally other components E or F first being produced and this composite layer subsequently being bound at high temperature and at high pressure to form an inseparable unit. Suitable temperatures and pressures are set out above.

Use

The laminated glass element according to the invention can be used in principle in all applications in which laminated glass elements are conventionally used. Owing to the integrated EL light structure, it is in particular possible to envisage applications as decorative elements or as safety elements for exterior and interior use.

Another aspect of the present application is therefore the use of a laminated glass element according to the invention as a decorative element and/or light element in interior spaces or for external use, preferably on external claddings of buildings, in or on items of equipment, in or on land or water vehicles or aircraft or in the advertising sector.

The present invention is explained in greater detail below with reference to the Figures. The Figures represent preferred configurations and should not be considered to be limiting.

FIGURES

FIG. 1: is a schematic illustration of an exemplary cross-section through a laminated glass element (1) with the at least two glass elements (3, 4) being arranged symmetrically in a non-laminated state.

FIG. 2: is a schematic illustration of an exemplary cross-section through a laminated glass element (1) with the at least two glass elements (3, 4) including two thin insulating layers (19, 20) being arranged symmetrically in a non-laminated state.

FIG. 3: is a schematic illustration of an exemplary cross-section through a laminated glass element (1) with the at least two glass elements (3, 4) being arranged symmetrically with a co-extruded composite film (12') in a non-laminated state.

FIG. 4: is a schematic illustration of an exemplary cross-section through a laminated glass element (1) with the at least two glass elements (3, 4) being arranged asymmetrically in a non-laminated state.

FIG. 5: is a schematic plan view of an exemplary laminated glass element (1) with the at least two glass elements (3, 4) being arranged in a laterally offset asymmetrical manner.

FIG. 6: is a schematic plan view of an exemplary laminated glass element (1) with the at least two glass elements (3, 4) being arranged in an asymmetrical manner offset towards the right and in an upward direction.

FIG. 7: is a schematic plan view of an exemplary laminated glass element (1) with the at least two glass elements (3, 4) protruding in a symmetrical manner.

FIG. 8: is a schematic illustration of an exemplary cross-section through an insulating glass element (2) having a laminated glass element (1) with the at least two glass elements (3, 4) being arranged symmetrically.

FIG. 9: is a schematic illustration of an exemplary building (25) with glass elements (1, 2).

FIG. 10: is a schematic illustration of an exemplary wall element (26) having a frame (27) and an integrated glass element (1, 2).

FIG. 11: is a schematic illustration of an exemplary light (28).

LIST OF REFERENCE NUMERALS

1. Laminated glass element having an EL light structure, preferably an inorganic alternating current thick-film powder electroluminescence (AC-P-EL) light structure
2. Insulating glass element having at least one laminated glass element with an EL light structure, preferably an inorganic alternating current thick-film powder electroluminescence (AC-P-EL) light structure
3. First glass element (at least partially transparent substrate): Float glass or white glass which has a low level of iron oxide or tempered safety glass (TSG) or partially tempered glass (TVG) or laminated safety glass (LSG)
4. Second glass element (at least partially transparent substrate): Float glass or white glass which has a low level of iron oxide or tempered safety glass (TSG) or partially tempered glass (TVG) or laminated safety glass (LSG)
5. Third glass element: Float glass or white glass which has a low level of iron oxide or tempered safety glass (TSG) or partially tempered glass (TVG) or laminated safety glass (LSG)
6. First electrode (electrically conductive coating): substantially transparent thin and electrically conductive coating
7. Second electrode (electrically conductive coating): substantially transparent thin and electrically conductive coating
8. Contact strip right
9. Contact strip left
10. EL connection right
11. EL connection left
12. Laminated safety glass composite mass (polymer adhesive agent): in particular PVB film with <0.38 mm thickness or 12' in the form of a co-extruded film
13. Functional particles in the laminated safety glass matrix (matrix of the polymer adhesive agent)
14. Laminated safety glass matrix
15. EL emission
16. EL light structure, preferably inorganic alternating current thick-film powder electroluminescence (AC-P-EL) light structure
17. EL pigments or powder
18. EL binder matrix
19. First insulating layer
20. Second insulating layer
21. Spacer: for example, an aluminium profile
22. Secondary sealing
23. Drying means inside the spacer profile
24. Opening in the spacer profile to the insulating glass cavity
25. Building
26. Wall: brickwork of a building, outer portion of a land vehicle, water vehicle or aircraft, outer portion of a container and the like
27. Frame
28. Lamp or light
29. Single graphically configured light element: for example, dot, square, triangle, rectangle or line, star or polygon, annulus 30. Light elements arranged in a regular manner
31. Light elements arranged in a random manner
32. Graphically configured arrangement of individual light elements.

FIG. 1 is a schematic illustration of an exemplary cross-section through a laminated glass element (1) with the at least two glass elements (3, 4) being arranged in a symmetrical manner in a non-laminated state. Such a symmetrical arrangement of the glass elements (3, 4) one above the other can also be achieved by both contact strips (8, 9) being arranged at one side and the connections (10, 11) also being arranged at one side. In principle, however, the contact strips may extend around all four edges. The type of arrangement and the configuration of the contact strips (8, 9) and the EL connections (10, 11) is dependent inter alia on the size of the laminated glass element (1) and the surface-area resistance of the two transparent electrodes (6, 7) and the desired emission brightness (15).

In the arrangement of the contact strips (8, 9) at the lateral edges of the glass elements (3, 4) which are located one above the other, the thickness of the contact strip (8, 9) and the thickness of the connections (10, 11) are adapted to the thickness of the laminated safety glass composite mass (12). In addition, care must be taken to provide appropriate insulation in these regions. The electrode region (6, 7) facing a contact strip (8, 9) in each case can be ground away, etched away or removed by means of radiation, or it is possible to carry out a small scratching, milling or laser operation. The electrode region (6, 7) below the contact strips (8, 9) is electrically insulated from the remainder of the electrodes (6, 7).

The EL light structure, preferably an AC-P-EL light structure (16) is generally applied to the surface of the electrode (6) using a technical printing method involving screen printing, dispenser application or inkjet application or using a doctor blade method, a roller coating method, a curtain pouring method or a transfer method. The light structure (16) generally comprises a binding agent matrix (18) with EL pigments (17) which are dispersed therein in a homogeneous manner. The binding agent matrix (18) is generally selected in such a manner that a good level of adhesive-bonding is produced on the electrode layer (6) and, in a subsequent lamination operation, a good level of adhesive bonding is possible with the laminated safety glass composite mass (12). In a preferred configuration, PVB or PU based system are used. In addition to EL pigments (17), other additives in the binding agent matrix (18) may also be advantageous, such as colour-converting organic or inorganic systems and also colour additives for a day and night light effect and/or reflective and/or light-absorbing effect pigments, such as aluminium flakes or glass flakes or mica platelets. The EL pigments (17) may be used in the microencapsulated or non-microencapsulated state. Specially non-microencapsulated EL pigments (17) can also be used with smaller pigment dimensions of up to below 10 μm, so that the transparency of the glass element (1) can be increased. The EL-emission (15) with large surface-area applications may be from 5 cd/m$^2$ to more than 100 cd/m$^2$ (further details can be taken from the above portion of the description). The service life or the half life period, that is to say, the time within which the initial brightness (15) of the glass element (1) has decreased by half, is considerably higher compared with currently conventional service-life periods of from approximately 2,000 to 3,500 hours, since the two glass substrates (3, 4), together with the laminated safety glass composite mass (12) provide very effective protection for the electroluminophores (17) against the effects of water vapour. In the case of external applications in building claddings, it may be advantageous, in addition to the normal UV filtering of glass substrates from approximately 380 nm, to provide an additional UV protective layer, this layer also having a UV filter effect if the electrode layer (6) is constructed in an appropriate manner.

In the event of resistive conductivity, it is also possible to incorporate an additional insulation. This is indicated schematically in FIG. 2 by the incorporation of the two insulating layers (19, 20), it also being possible in principle to have only one insulating layer.

FIG. 2 is a schematic illustration of an exemplary cross-section through a laminated glass element (1) with the at least two glass elements (3, 4) including two thin insulating layers (19, 20) being arranged in a symmetrical manner in a non-laminated state. In this illustration, two additional insulating layers (19, 20) are provided on the electrode layers (6, 7). Such insulating layers (19, 20) are often applied to electrically conductive glass coatings (6, 7) for the purposes of passivation and are mostly constructed using a vacuum method or chemically in the form of thin and very highly transparent oxide-containing or nitride-containing layers of some 50 to 100 nm thickness. Such insulating layers (19, 20) also provide good electrical insulation at high temperatures and also allow a good level of adhesive-bonding with the EL binder matrix (18) or with the laminated safety glass composite mass matrix (14) and are generally also very stable in chemical terms. However, the insulating layers (19, 20) are generally intended to be removed in the region of the contact strips (8, 9). Appropriate methods for removal are cited in the description. In principle, the application of the insulating layer (19, 20) can also be carried out by means of conventional roller or curtain pouring or spray coating methods or by means of screen printing. It is possible to select a transparent thin glass frit coating or a thin and transparent polymer coating operation can be carried out.

FIG. 3 is a schematic illustration of an exemplary cross-section through a laminated glass element (1) with the at least two glass elements (3, 4) being arranged in a symmetrical manner with a co-extruded composite film (12) in a non-laminated state. In this configuration, the laminated safety glass composite mass (12) is illustrated in the form of a co-extruded PVB film with surface-integrated EL pigments (17). EL particles (17) dispersed in a homogeneous manner in a laminated safety glass composite mass matrix (14) are extruded onto a laminated safety glass composite mass (12') or vice-versa. In the laminated safety glass composite mass (12'), as described above, functional particles (13) are incorporated in order to increase the relative dielectric constant. A configuration of this type brings about an EL emission (15) over the entire surface. This may also be achieved using additional graphic prints which have light-impermeable or translucent properties.

FIG. 4 is a schematic illustration of an exemplary cross-section through a laminated glass element (1) with the at least two glass elements (3, 4) being arranged in an asymmetrical manner in a non-laminated state. This variant is intended to indicate that the arrangement of the contact strips (8, 9) may also be open. In this manner, the contact connections (10, 11) can be produced in a very simple manner and also in principle not until a complete glass element (1) has been installed. The glass projection may generally be from a few mm, for example, 1 mm, up to 10 mm and beyond.

FIG. 5 is a schematic plan view of an exemplary laminated glass element (1) with the at least two glass elements (3, 4) being arranged in a laterally offset asymmetrical manner. In addition, this Figure indicates the possibilities for the graphic configuration of individual light elements (29), for example, as a dot, square, triangle, rectangle, or line, star or polygon or annulus. Such light elements (29) may be constructed in a regular manner (30) or randomly or consciously in an irregular manner (31) or in a graphically configured manner (32), for example, in the form of figures or logos. The individual light elements (29) may be constructed with EL particles (17) with differing emissions or with a mixture of EL particles (17). The individual EL particles (17) may also be provided with colour-converting coatings and colour-converting or colour-filtering additives may also be incorporated into the individual binding agents.

Figure 1:
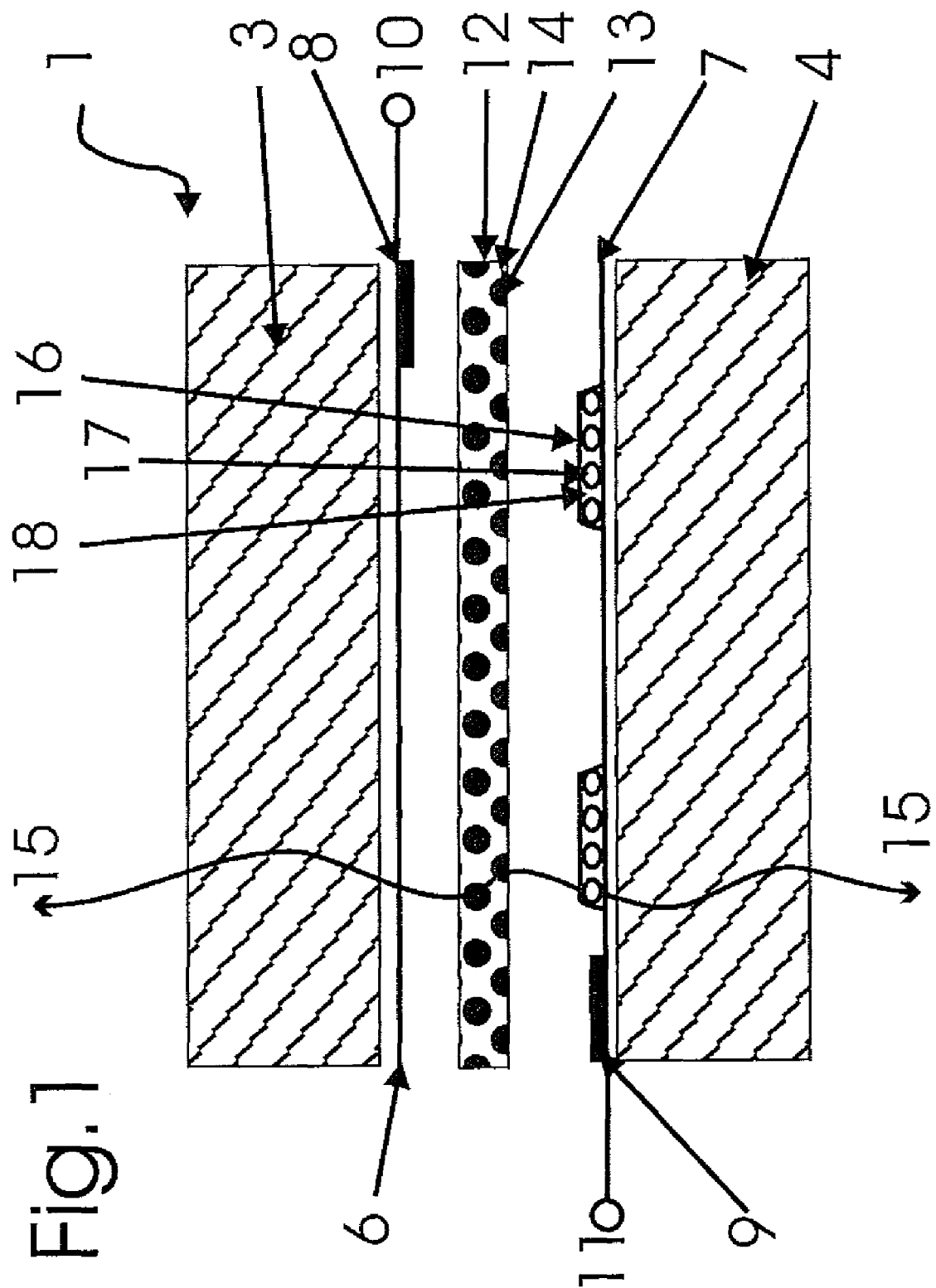
Figure 2:
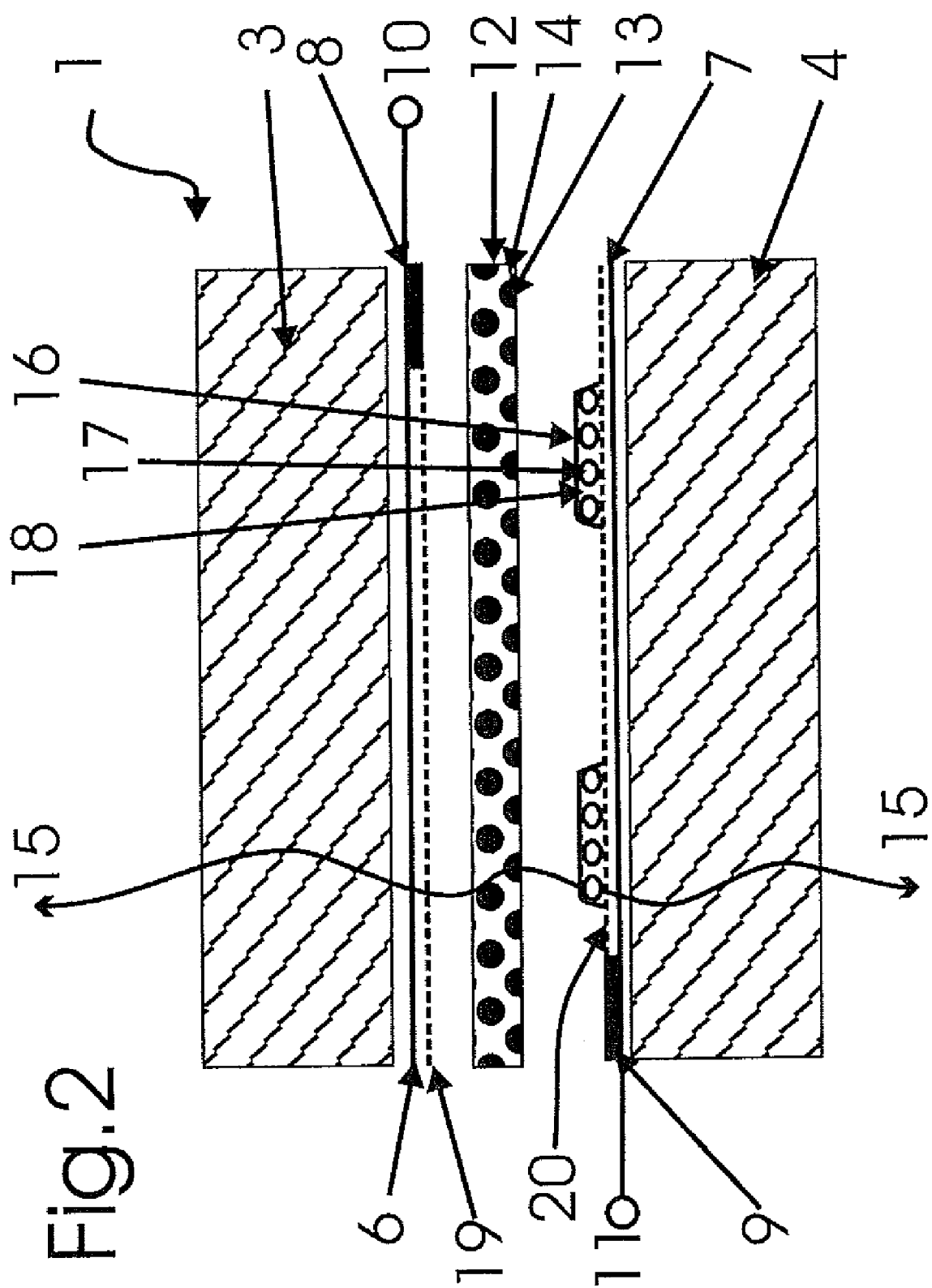
Figure 3:
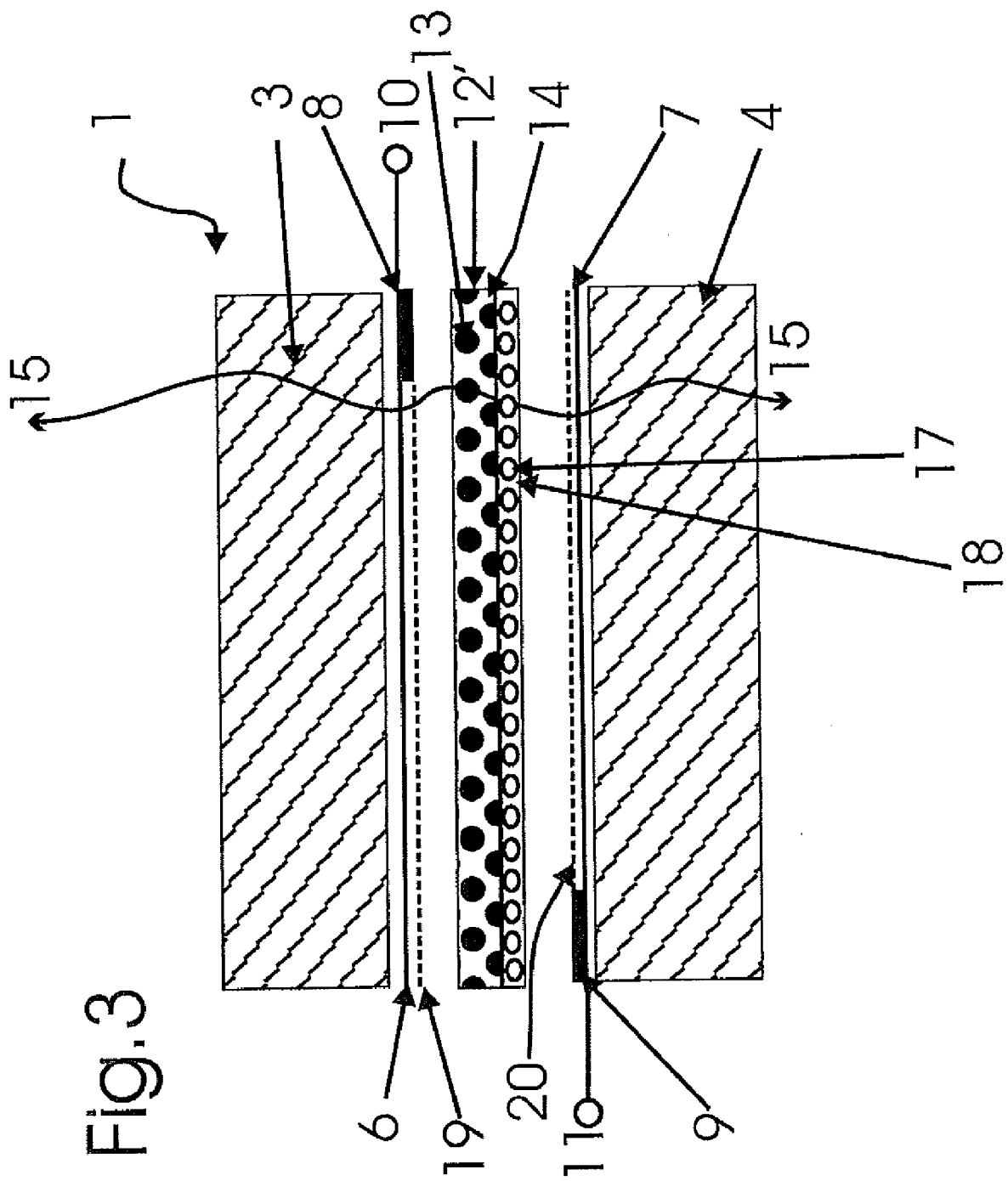
Figure 4:
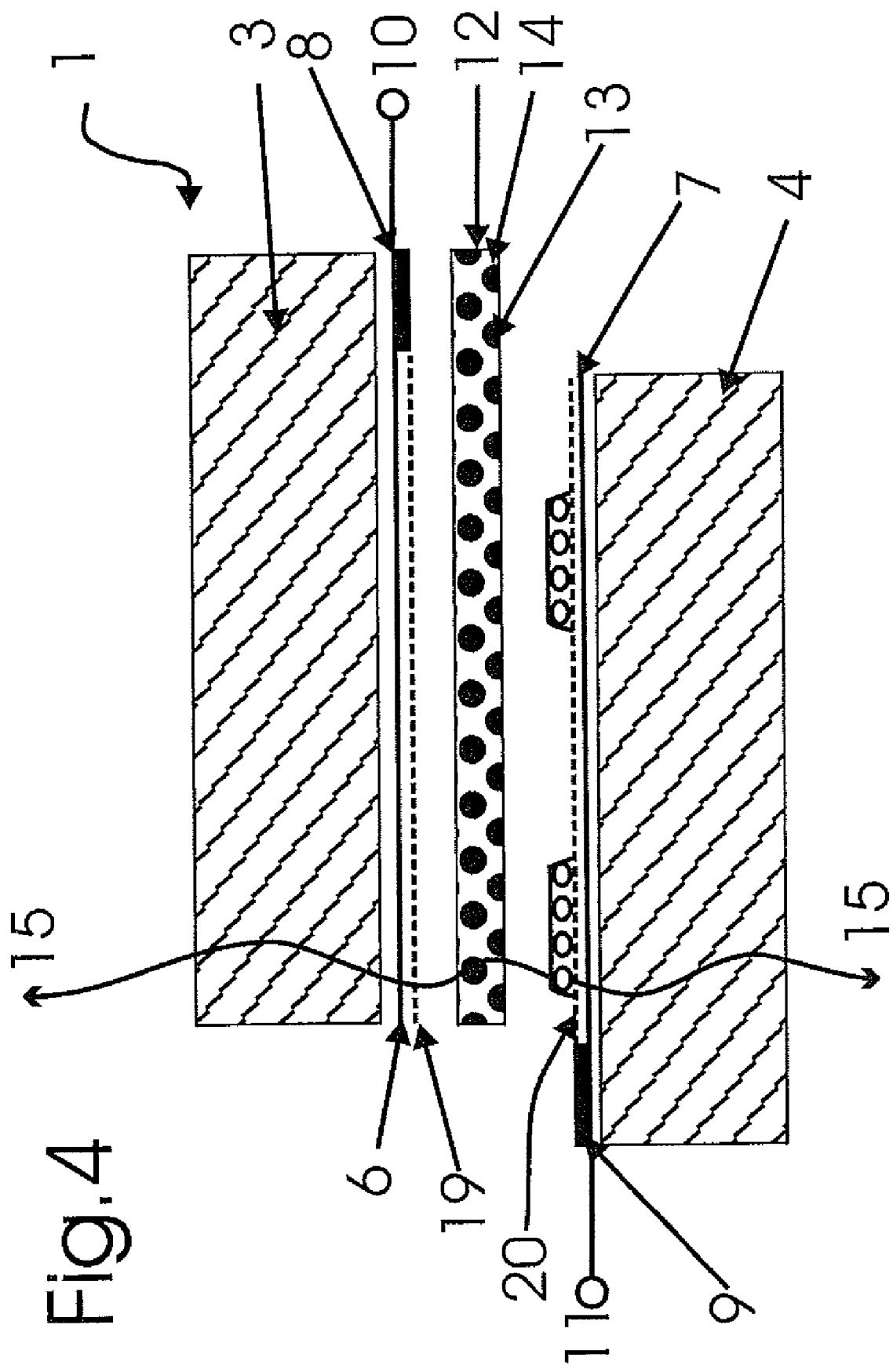
Figure 5:
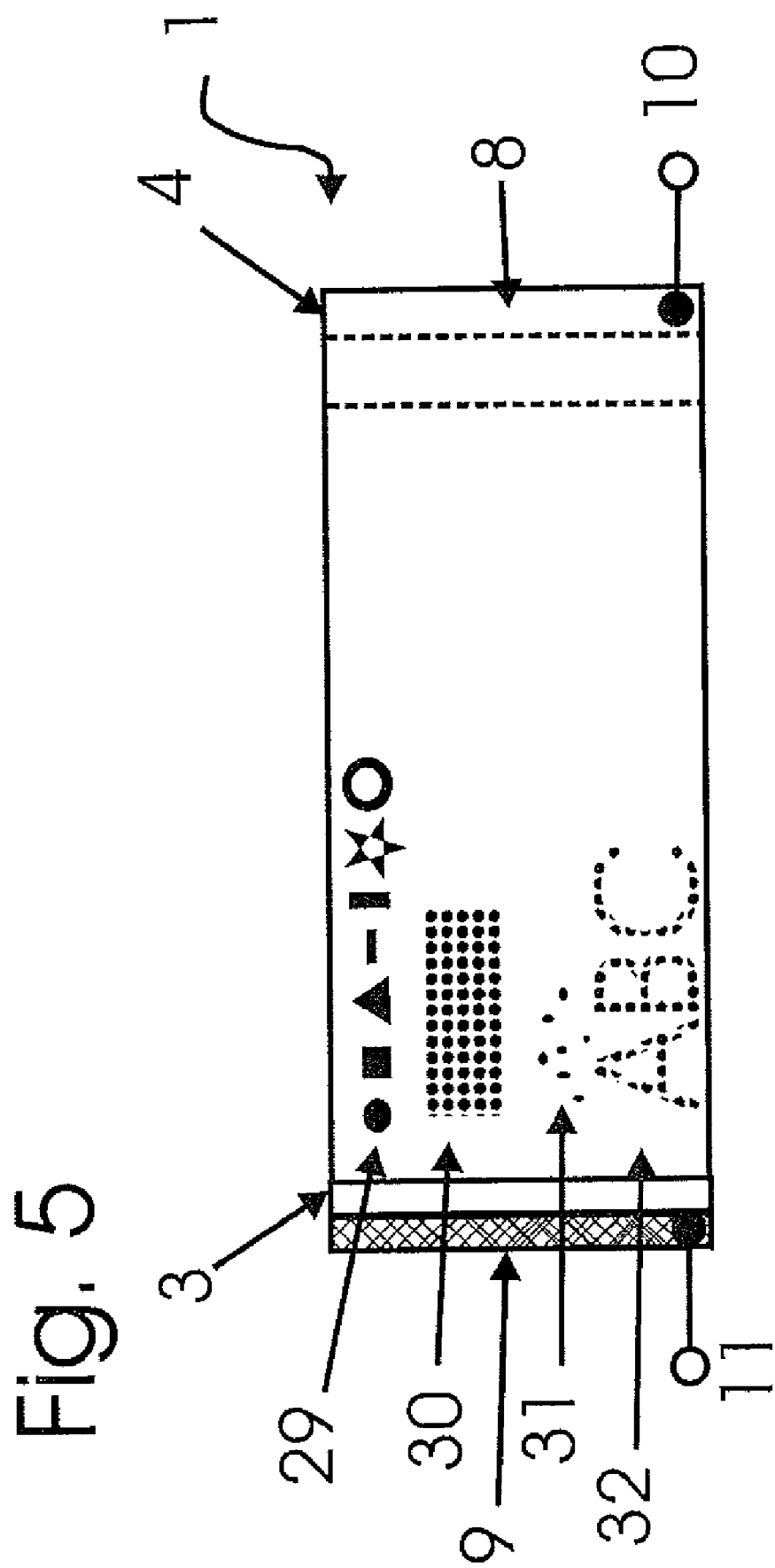
Figure 6:
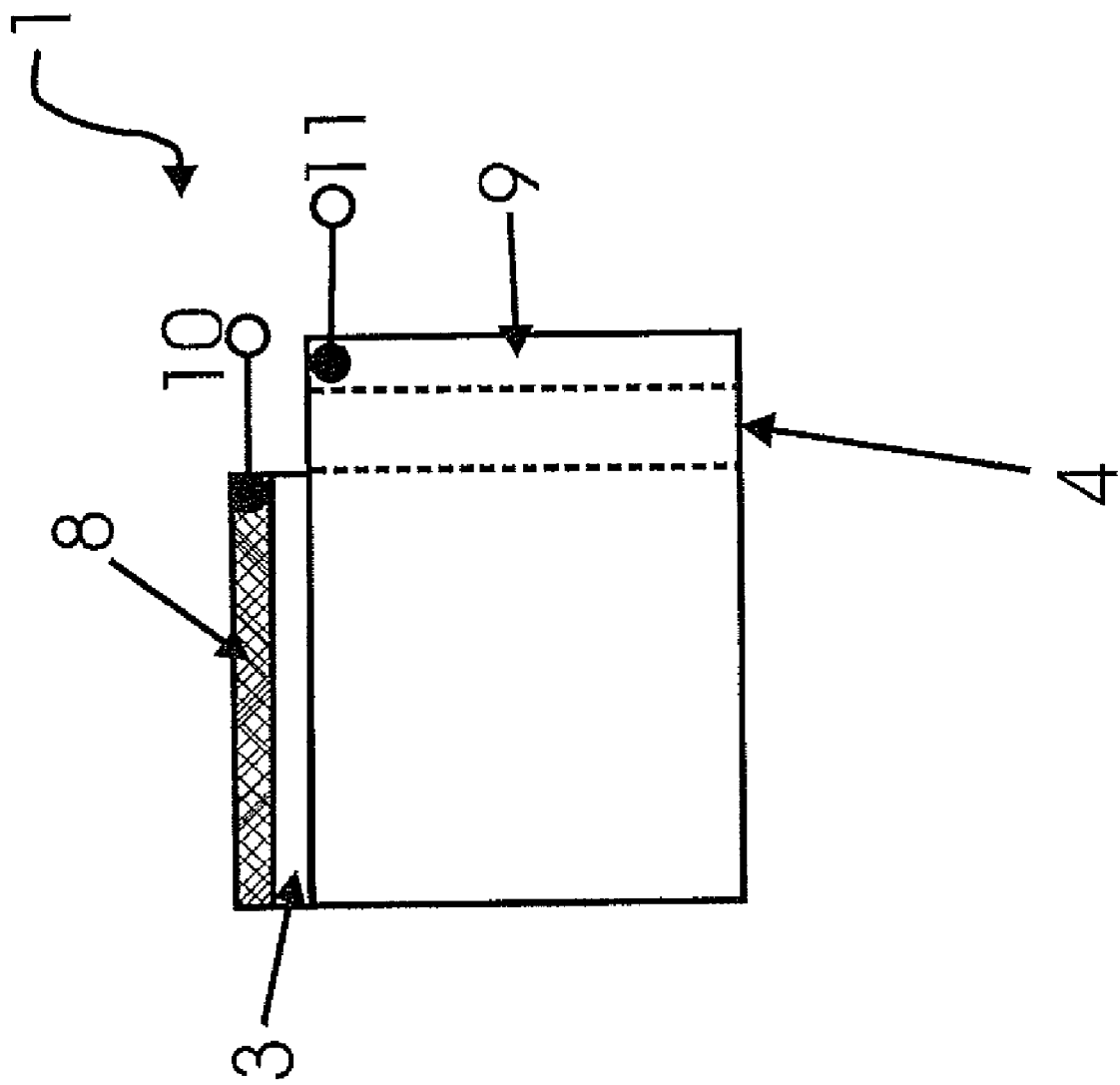
FIG. 6 is a schematic plan view of an exemplary laminated glass element (1) with the at least two glass elements (3, 4) being arranged in an asymmetrical manner offset to the right and in an upward direction. This arrangement is intended to indicate, purely by way of example, the numerous possibilities for arrangement of the contact strips (8, 9) and the connections (10, 11).
Figure 7:
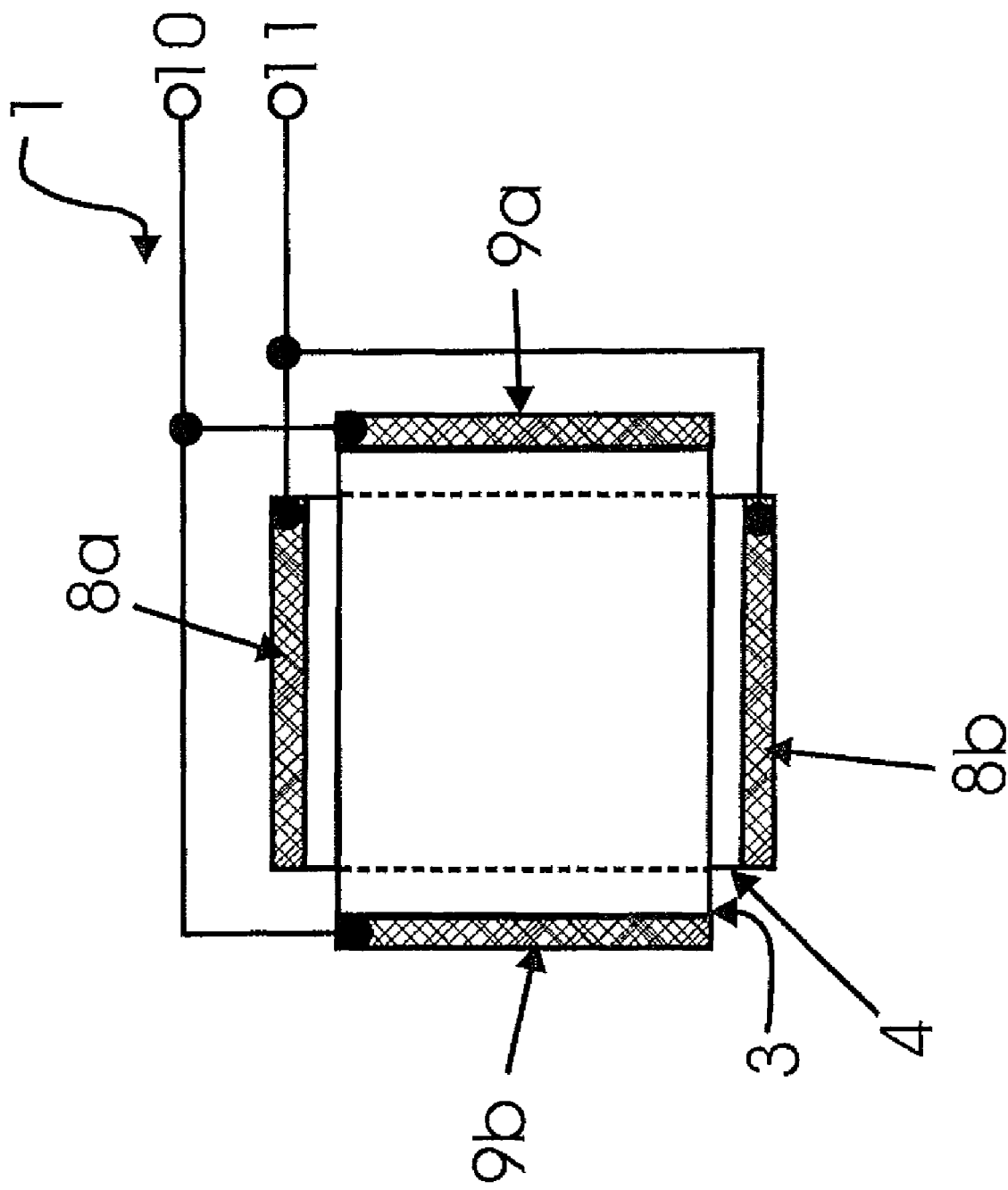
FIG. 7 is a schematic plan view of an exemplary laminated glass element (1) with the at least two glass elements (3, 4) protruding in a symmetrical manner. Such a configuration allows optimum contacting of the glass elements (3, 4) at the opposing edges in each case.
Figure 8:
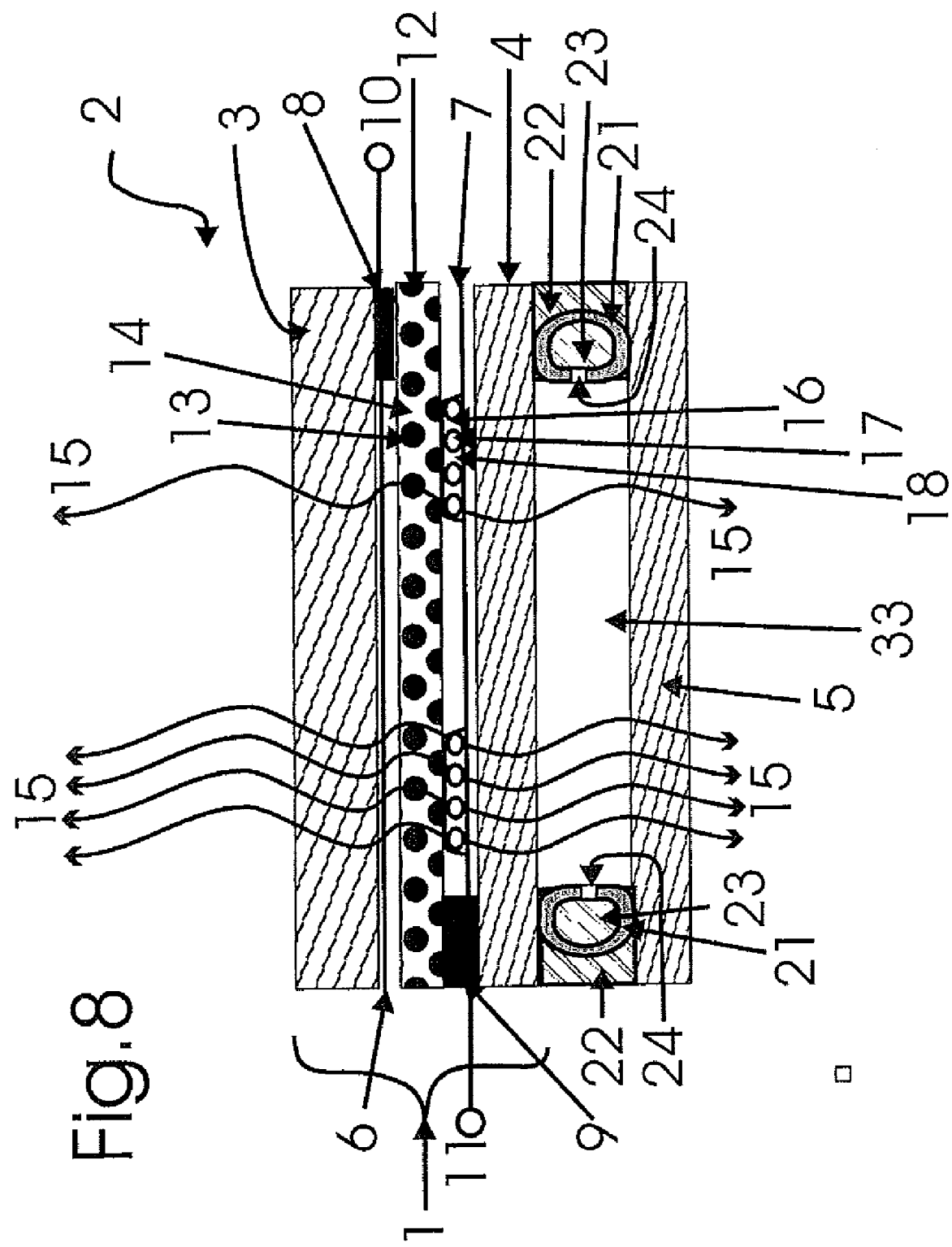
FIG. 8 is a schematic illustration of an exemplary cross-section through an insulating glass element (2) having a laminated glass element (1) with the at least two glass elements (3, 4) being arranged in a symmetrical manner. In this example, one possible insulating glass structure (2) using a laminated glass element (1) and a third glass element (5) is described.

The insulating glass composition (2) is produced according to the prior art using a spacer (21) of an aluminium or steel profile and a so-called secondary sealing (22) which connects the laminated glass element (1) or the second glass element (4) to the third glass element (5) in a permanently resilient manner by means of the spacer (21). Owing to the edge bond (22, 21), a hermetically sealed intermediate space (33) is produced which can conventionally be filled with an inert gas.

The spacer profiles (21) are conventionally filled with drying agents (23) which are connected to the intermediate space (33) by means of openings (24) and which are intended to adsorb any water vapour which may be introduced and are thus intended to increase the service life of the insulating glass composition (2).

In principle, the glass elements (3, 4, 5) may be formed from simple float glass or from a white glass which has a low level of iron oxide or from a tempered safety glass, laminated safety glass or partially tempered glass element. All the glass surfaces may be provided with various heat-protecting, light-absorbing, light-reflecting and/or scratch-resistant and/or easy-to-clean coatings, or with coatings having an additional function.

The insulating glass element (2) may also be constructed with two intermediate spaces (33) and a fourth glass element.

Figure 9:
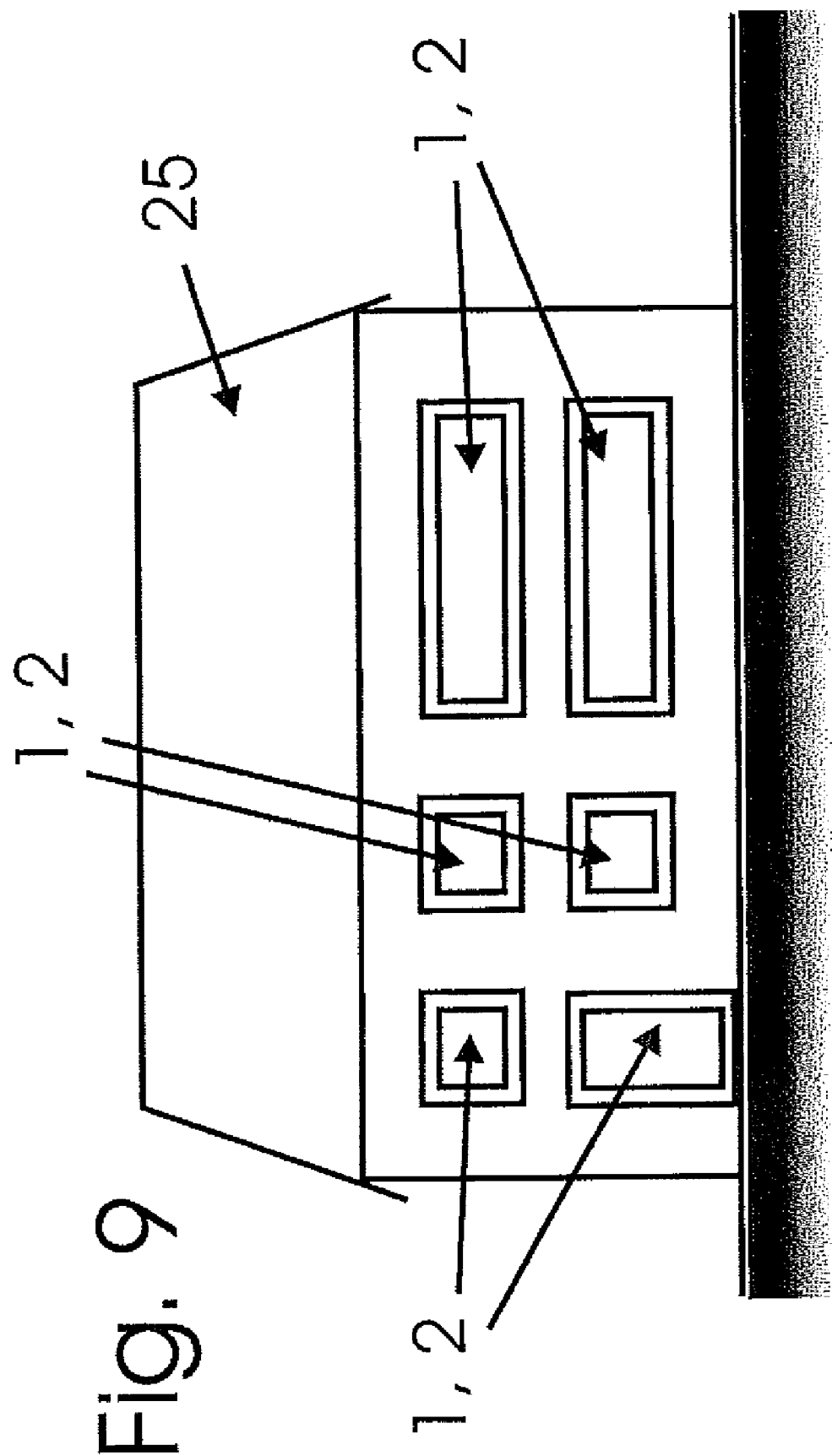

FIG. 9 is a schematic illustration of an exemplary building (25) with glass elements (1, 2). In place of a building (25), a land or water vehicle or aircraft or a container may also comprise glass elements (1, 2).

Figure 10:
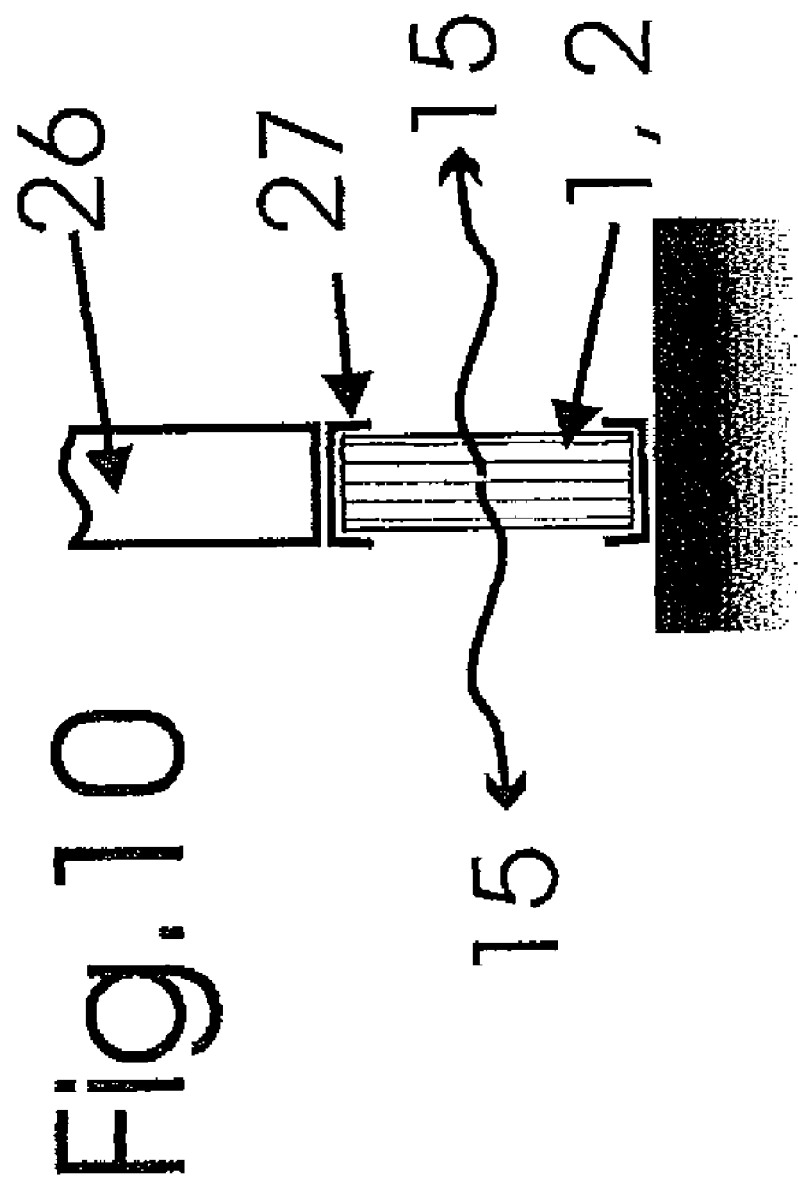

FIG. 10 is a schematic illustration of an exemplary wall element (26) having a frame (27) and integrated glass element (1, 2). This Figure is intended to schematically illustrate the integration of a glass element (1, 2) in a building or vehicle by means of a frame construction (27) purely by way of example. In place of a frame (27), it is also possible to have installation variants with no frames.

Figure 11:
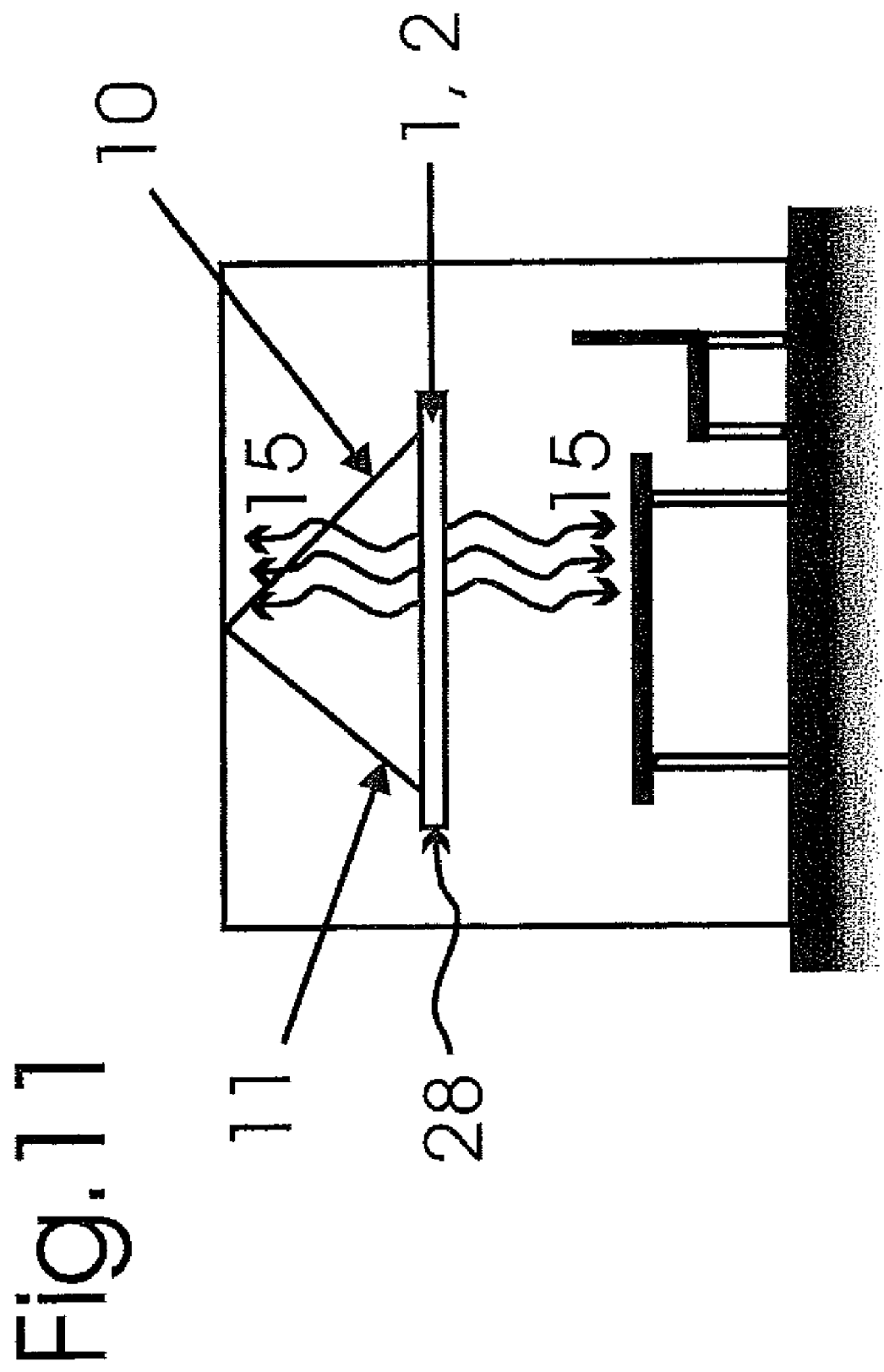

FIG. 11 is a schematic illustration of an exemplary light (28). This Figure is intended to indicate the possibility for constructing a light (28) as a room illumination member by way of example. The electrical connections (10, 11) are also indicated purely by way of example. Such a light (28) may also be constructed as a room partition element or as a staircase delimitation element and the like.

The invention claimed is:

1. A laminated glass element, or a laminated safety glass element, with integrated electroluminescence light structure, comprising:
    a) a first at least partially transparent substrate which has an inner side and an outer side, the inner side including a first electrically conductive coating which constitutes a first electrode A,
    b) an at least partially transparent polymer adhesive agent B of a plastics material, which has a dielectric constant of at least 30 measured at 1 kHz and which is arranged at the inner side of the first at least partially transparent substrate adjacent to the coating,
    c) at least one electroluminescence light structure C which is arranged adjacent to the polymer adhesive agent at the inner side of the first at least partially transparent substrate, the at least one electroluminescence light structure being arranged over the entire surface of the first at least partially transparent substrate or on one or more part-surfaces of the first at least partially transparent substrate,
    d) a second at least partially transparent substrate which has an inner side and an outer side and which is arranged adjacent to the at least one electroluminescence light structure, the inner side of the second at least partially transparent substrate including a second electrically conductive coating, which constitutes a second electrode D, and being arranged in the direction towards the inner side of the first at least partially transparent substrate.

2. The laminated glass element according to claim 1, wherein each of the first and second at least partially transparent substrates comprises a glass substrate.

3. The laminated glass element according to claim 2, wherein the glass substrate is selected from the group comprising float glass, tempered safety glass, and partially tempered glass.

4. The laminated glass element according to claim 1, wherein the coatings of the first and the second at least partially transparent substrate each comprise an electrically conductive at least partially transparent thin film.

5. The laminated glass element according to claim 4, wherein the coatings are applied to each of the first and the second at least partially transparent substrate by means of a sputter method, a deposition method, by means of a vacuum or in a pyrolytic manner.

6. The laminated glass element according to any one of claim 1, wherein the at least partially transparent polymer adhesive agent B is material comprising one of a casting resin or a thermoplastic composite film.

7. The laminated glass element according to any one of claim 6, wherein the thermoplastic composite film is selected from the group comprising polyvinylbutyral, ethylene vinyl acetate, polyacrylate, polymethyl methacrylate, polyurethane, polyvinyl alcohol and polyvinyl chloride, preferably polvinylbutyral.

8. The laminated glass element according to claim 6, wherein the material forms a composite mass matrix to which substantially transparent elements in the form of nanoscale particles, nanoscale agglomerates, dendritic particles, submicrometre and micrometre-sized crystalline particles and combinations thereof are added.

9. The laminated glass element according to claim 8, wherein the substantially transparent elements are Single-Walled-Carbon-Nano-Tubes (SWCNTs) and/or metal nanotubes.

10. The laminated glass element according to claim 6, wherein the thermoplastic composite film is interwoven with an electrically conductive metal fabric.

11. The laminated glass element according to claim 1, wherein the at least one electroluminescence light structure C is an alternating current thick-film powder electroluminescence (AC-P-EL) light structure.

12. The laminated glass element according to claim 11, wherein the at least one AC-P-EL light structure includes pigments which are not microencapsulated.

13. The laminated glass element according to claim 1, wherein the at least one electroluminescence light structure is arranged in a graphically configured manner.

14. The laminated glass element according to claim 12, wherein the graphically configured electroluminescence light structure is formed from a plurality of light elements, the individual light elements being formed from sub-elements which are arranged in a geometrically precise or random manner adjacent to the at least partially transparent polymer adhesive agent B.

15. The laminated glass element according to claim 14, wherein the sub-elements comprise one or more of symbols, dots, rectangles, triangles, squares, lines, circles, stars, and letters.

16. The laminated glass element according to claim 14, wherein the light elements of the at least one electroluminescence light structure have different emission colours.

17. The laminated glass element according to claim 14, wherein more than one electroluminescence light structure is used, and the electroluminescence light structures have different emission colours.

18. A method for producing a laminated glass element according to claim 1, the method comprising: applying the at least one electroluminescence light structure C to one of the electrode A, the electrode D, or the polymer adhesive agent B by screen printing.

19. A method for producing a laminated glass element according to claim 1, the method comprising:
  producing a composite layer from at least the components A, B, C and D; and
  binding the composite layer at high temperature and at high pressure to form an inseparable unit.

* * * * *